US009998863B2

(12) United States Patent
Mycek et al.

(10) Patent No.: US 9,998,863 B2
(45) Date of Patent: Jun. 12, 2018

(54) SYSTEM AND METHOD FOR PROVIDING CONTENT USING BEACON SYSTEMS

(71) Applicant: Estimote, Inc., New York, NY (US)

(72) Inventors: Marcin Mycek, Kraków (PL); Michal Sznajder, Oświęcim (PL); Grzegorz Krukiewicz-Gacek, Kraków (PL); Lukasz Kostka, Walnut, CA (US); Jakub Krzych, Walnut, CA (US)

(73) Assignee: Estimote Polska Sp. z o. o., Cracow (PL)

( * ) Notice: Subject to any disclaimer, the term of this patent is extended or adjusted under 35 U.S.C. 154(b) by 0 days. days.

(21) Appl. No.: 15/436,564

(22) Filed: Feb. 17, 2017

(65) Prior Publication Data
US 2017/0164159 A1    Jun. 8, 2017

Related U.S. Application Data

(63) Continuation-in-part of application No. 15/288,302, filed on Oct. 7, 2016, now Pat. No. 9,712,967, which
(Continued)

(51) Int. Cl.
*G01S 1/00* (2006.01)
*H04W 4/02* (2018.01)
(Continued)

(52) U.S. Cl.
CPC ........ *H04W 4/021* (2013.01); *G06Q 30/0267* (2013.01); *G06Q 30/0639* (2013.01);
(Continued)

(58) Field of Classification Search
CPC ......... G06K 19/0723; G06K 19/07749; G06K 19/0775; G06K 19/07758; G06C 30/0261;
(Continued)

(56) References Cited

U.S. PATENT DOCUMENTS

| 6,091,358 A | 7/2000 | Maniscalco et al. |
| 6,873,258 B2 | 3/2005 | Marples et al. |

(Continued)

FOREIGN PATENT DOCUMENTS

| WO | 21429 | 3/2002 |
| WO | 021429 | 3/2003 |

(Continued)

*Primary Examiner* — Chuong P Nguyen
(74) *Attorney, Agent, or Firm* — Jeffrey Schox; Diana Lin

(57) ABSTRACT

A method and system for broadcasting a beacon identifier identifying the beacon system from the beacon system to a user device, receiving the beacon identifier at a content determination system from the user device, determining contextual content at the content determination system based on the beacon identifier, transmitting the contextual content from the content determination system to the user device, where the user device automatically transmits the contextual content to the first beacon system in response to receiving the contextual content, receiving the contextual content at the beacon system from the user device, and controlling the output display with the beacon system to present the contextual content.

14 Claims, 12 Drawing Sheets

Related U.S. Application Data is a continuation of application No. 14/956,209, filed on Dec. 1, 2015, now Pat. No. 9,491,586, which is a continuation of application No. 14/463,582, filed on Aug. 19, 2014, now Pat. No. 9,202,245.

(60) Provisional application No. 61/867,493, filed on Aug. 19, 2013, provisional application No. 61/867,498, filed on Aug. 19, 2013, provisional application No. 62/393,903, filed on Sep. 13, 2016, provisional application No. 62/318,857, filed on Apr. 6, 2016, provisional application No. 62/296,254, filed on Feb. 17, 2016.

(51) Int. Cl.
| | |
|---|---|
| *H04W 4/00* | (2018.01) |
| *H04W 76/00* | (2018.01) |
| *H04W 76/02* | (2009.01) |
| *G06Q 30/06* | (2012.01) |
| *H04W 4/04* | (2009.01) |
| *H04W 4/20* | (2018.01) |
| *H04W 88/08* | (2009.01) |
| *G06Q 30/02* | (2012.01) |
| *H04W 8/00* | (2009.01) |
| *H04B 1/3888* | (2015.01) |
| *G06F 17/30* | (2006.01) |
| *H04W 12/06* | (2009.01) |

(52) U.S. Cl.
CPC ........... *H04W 4/008* (2013.01); *H04W 4/027* (2013.01); *H04W 4/04* (2013.01); *H04W 4/206* (2013.01); *H04W 76/002* (2013.01); *H04W 76/021* (2013.01); *H04W 88/08* (2013.01); *G06F 17/3087* (2013.01); *G06Q 30/0261* (2013.01); *G06Q 30/0281* (2013.01); *G06Q 30/0633* (2013.01); *G06Q 30/0641* (2013.01); *H04B 1/3888* (2013.01); *H04W 8/005* (2013.01); *H04W 12/06* (2013.01)

(58) Field of Classification Search
CPC .. G06C 30/0639; H04W 4/008; H04W 4/021; H04W 4/04; H04W 4/206; H04W 8/005; H04W 12/06; H04W 76/002; H04W 76/021; H04W 88/08; G07C 9/00111; G06Q 30/0261; G06Q 30/0639; G06Q 30/0267; G06Q 30/0633; G06Q 30/0641; G06F 17/3087
USPC ....... 342/385, 399; 340/539.13, 572.1, 572.8
See application file for complete search history.

(56) References Cited

U.S. PATENT DOCUMENTS

| | | | |
|---|---|---|---|
| 7,027,808 B2 | 4/2006 | Wesby | |
| 7,038,584 B2 | 5/2006 | Carter | |
| D524,377 S | 7/2006 | Moskovitz | |
| 7,072,671 B2 | 7/2006 | Leitch | |
| 7,146,178 B2* | 12/2006 | Lehikoinen | G06Q 30/0241 455/456.1 |
| 7,283,846 B2* | 10/2007 | Spriestersbach | G06Q 10/10 455/456.1 |
| 7,312,752 B2 | 12/2007 | Smith et al. | |
| 7,458,825 B2 | 12/2008 | Atsmon et al. | |
| 7,499,462 B2 | 3/2009 | MacMullan et al. | |
| 7,639,131 B2 | 12/2009 | Mock et al. | |
| 7,705,728 B2 | 4/2010 | Mock et al. | |
| 7,835,505 B2 | 11/2010 | Toyama et al. | |
| 7,855,679 B1 | 12/2010 | Braiman | |
| 7,983,677 B2 | 7/2011 | Dacosta | |
| 8,058,988 B1 | 11/2011 | Medina, III et al. | |
| 8,139,945 B1 | 3/2012 | Amir et al. | |
| 8,260,320 B2* | 9/2012 | Herz | H04M 3/42348 455/456.1 |
| 8,265,621 B2* | 9/2012 | Kopikare | H04W 8/005 370/338 |
| 8,489,112 B2 | 7/2013 | Roeding et al. | |
| 8,520,648 B2 | 8/2013 | Cordeiro | |
| 8,559,975 B2 | 10/2013 | Lin et al. | |
| 8,594,850 B1 | 11/2013 | Gourlay et al. | |
| 8,612,604 B2 | 12/2013 | Beatty et al. | |
| 8,644,255 B1 | 2/2014 | Burcham et al. | |
| 8,694,060 B2 | 4/2014 | Vanderaa et al. | |
| 8,694,782 B2 | 4/2014 | Lambert | |
| 8,723,720 B2 | 5/2014 | Moffatt et al. | |
| 8,781,502 B1 | 7/2014 | Middleton et al. | |
| 8,791,901 B2 | 7/2014 | Mallinson | |
| 8,797,214 B2 | 8/2014 | Taylor et al. | |
| 8,844,007 B2 | 9/2014 | Vicente et al. | |
| 8,847,754 B2 | 9/2014 | Buchheim et al. | |
| 8,867,993 B1 | 10/2014 | Perkins et al. | |
| 8,868,133 B1 | 10/2014 | Rosenbaum et al. | |
| 8,886,230 B2* | 11/2014 | Sydir | H04W 4/021 455/456.1 |
| 8,934,389 B2 | 1/2015 | Kuehnel et al. | |
| 8,938,196 B2* | 1/2015 | Bradish | H04W 48/10 370/310.2 |
| 8,971,850 B2 | 3/2015 | Klein et al. | |
| 8,988,221 B2 | 3/2015 | Raji et al. | |
| 8,996,030 B2 | 3/2015 | Grainger et al. | |
| 9,014,715 B2 | 4/2015 | Alizadeh-Shabdiz et al. | |
| 9,026,134 B2 | 5/2015 | Edge | |
| 9,033,255 B2 | 5/2015 | Tessier et al. | |
| 9,036,792 B2 | 5/2015 | Cacioppo et al. | |
| 9,063,212 B2 | 6/2015 | Jones, Jr. | |
| 9,113,309 B2 | 8/2015 | Uilecan et al. | |
| 9,113,343 B2 | 8/2015 | Moshfeghi | |
| 9,140,796 B2 | 9/2015 | Zhou | |
| 9,154,565 B2 | 10/2015 | Monighetti | |
| 9,202,245 B2 | 12/2015 | Kostka et al. | |
| 9,258,674 B2 | 2/2016 | Chen | |
| 9,282,436 B2 | 3/2016 | Chitre et al. | |
| 9,282,582 B1 | 3/2016 | Dunsbergen et al. | |
| 9,307,355 B2 | 4/2016 | Nehrenz et al. | |
| 9,351,114 B2 | 5/2016 | Chatterjee et al. | |
| 9,361,630 B1* | 6/2016 | Goswami | G06Q 30/0267 |
| 9,398,422 B2 | 7/2016 | Zampini, II | |
| 9,408,060 B2 | 8/2016 | Helms et al. | |
| 9,424,699 B2 | 8/2016 | Kusens et al. | |
| 9,445,305 B2 | 9/2016 | Lyon et al. | |
| 9,471,917 B2 | 10/2016 | Govindarajan et al. | |
| 9,474,962 B2 | 10/2016 | Barney et al. | |
| 9,491,575 B2 | 11/2016 | Edge et al. | |
| 9,558,507 B2 | 1/2017 | Zilkha | |
| 9,571,957 B2 | 2/2017 | Granbery | |
| 9,591,570 B2 | 3/2017 | Kubo et al. | |
| 9,621,446 B2 | 4/2017 | Pugh et al. | |
| 9,622,046 B2 | 4/2017 | Otis et al. | |
| 9,629,064 B2 | 4/2017 | Graves et al. | |
| 9,642,173 B2 | 5/2017 | Granbery | |
| 9,652,124 B2 | 5/2017 | Cotier et al. | |
| 9,689,955 B2 | 6/2017 | Rosenbaum | |
| 9,712,967 B2* | 7/2017 | Kostka | H04W 4/021 |
| 9,826,356 B2* | 11/2017 | Mycek | H04B 17/318 |
| 9,866,996 B1* | 1/2018 | Krzych | H04W 4/02 |
| 2003/0100315 A1 | 5/2003 | Rankin | |
| 2006/0163349 A1* | 7/2006 | Neugebauer | G06Q 20/387 235/383 |
| 2006/0290519 A1 | 12/2006 | Boate et al. | |
| 2008/0068519 A1 | 3/2008 | Adler et al. | |
| 2008/0139306 A1 | 6/2008 | Lutnick et al. | |
| 2008/0231460 A1 | 9/2008 | Owen et al. | |
| 2009/0005079 A1 | 1/2009 | Shields et al. | |
| 2009/0131079 A1 | 5/2009 | Sekhar | |
| 2009/0327135 A1 | 12/2009 | Nguyen et al. | |
| 2010/0019924 A1 | 1/2010 | D Alessandro et al. | |
| 2010/0099435 A1 | 4/2010 | Druzinic-Fiebach et al. | |
| 2010/0317371 A1 | 12/2010 | Westerinen et al. | |
| 2011/0029359 A1 | 2/2011 | Roeding et al. | |
| 2011/0238188 A1 | 9/2011 | Washiro | |

(56) References Cited

U.S. PATENT DOCUMENTS

| | | |
|---|---|---|
| 2012/0095805 A1 | 4/2012 | Ghosh et al. |
| 2012/0190386 A1 | 7/2012 | Anderson |
| 2012/0258730 A1 | 10/2012 | Tinnakornsrisuphap et al. |
| 2012/0309256 A1 | 12/2012 | Theodore |
| 2012/0316960 A1 | 12/2012 | Yang |
| 2012/0320815 A1 | 12/2012 | Massena |
| 2013/0030915 A1 | 1/2013 | Statler et al. |
| 2013/0225197 A1 | 8/2013 | McGregor et al. |
| 2014/0087758 A1 | 3/2014 | Maor |
| 2014/0122855 A1 | 5/2014 | Maneval |
| 2014/0148196 A1 | 5/2014 | Bassan-Eskenazi et al. |
| 2014/0220883 A1 | 8/2014 | Emigh et al. |
| 2014/0277654 A1 | 9/2014 | Reinhardt et al. |
| 2015/0058355 A1 | 2/2015 | Naqvi |
| 2015/0081474 A1 | 3/2015 | Kostka et al. |
| 2015/0106196 A1 | 4/2015 | Williams et al. |
| 2015/0140982 A1* | 5/2015 | Postrel .................. H04W 4/008 455/418 |
| 2015/0163828 A1 | 6/2015 | Vandwalle et al. |
| 2015/0276432 A1 | 10/2015 | Repyevsky et al. |
| 2015/0279115 A1 | 10/2015 | Vukicevic |
| 2015/0296048 A1 | 10/2015 | Gerding et al. |
| 2015/0334548 A1 | 11/2015 | Liu et al. |
| 2015/0351008 A1 | 12/2015 | Mayor |
| 2016/0014609 A1* | 1/2016 | Goel ...................... H04W 16/00 370/254 |
| 2016/0063550 A1 | 3/2016 | Caldwell |
| 2016/0086460 A1 | 3/2016 | King et al. |
| 2016/0094598 A1 | 3/2016 | Gedikian |
| 2016/0099758 A1 | 4/2016 | Bell et al. |
| 2016/0188919 A1 | 6/2016 | Gao et al. |
| 2016/0192407 A1 | 6/2016 | Fyfe et al. |
| 2016/0291127 A1 | 10/2016 | Huang et al. |
| 2017/0019765 A1 | 1/2017 | Hoyer et al. |
| 2017/0064667 A1* | 3/2017 | Mycek .................. G01S 5/0294 |
| 2017/0079001 A1* | 3/2017 | Lewis ..................... H04W 64/00 |

FOREIGN PATENT DOCUMENTS

| | | |
|---|---|---|
| WO | 135432 | 11/2008 |
| WO | 026862 | 2/2015 |
| WO | 043388 | 3/2016 |
| WO | 040690 | 3/2017 |

* cited by examiner

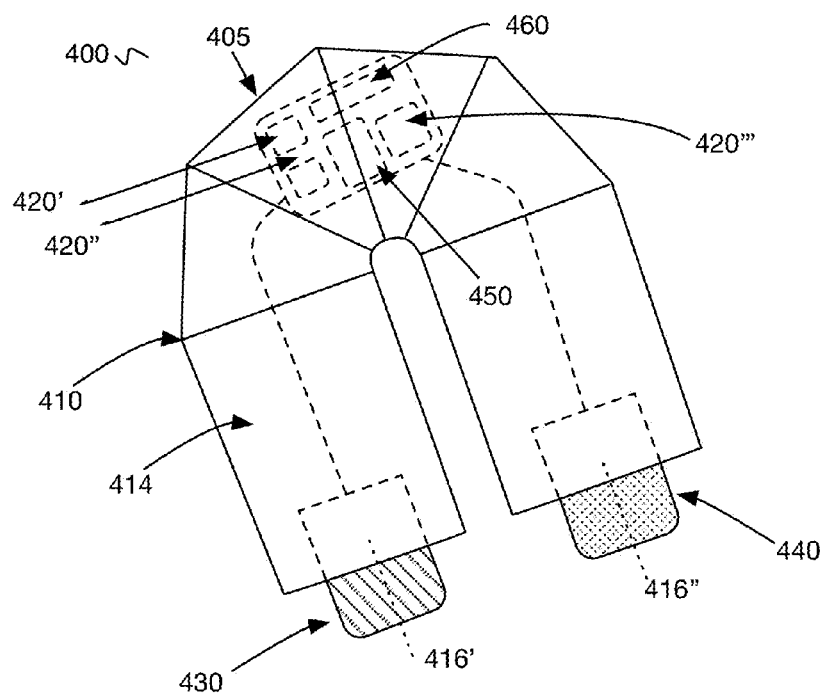
FIGURE 9A
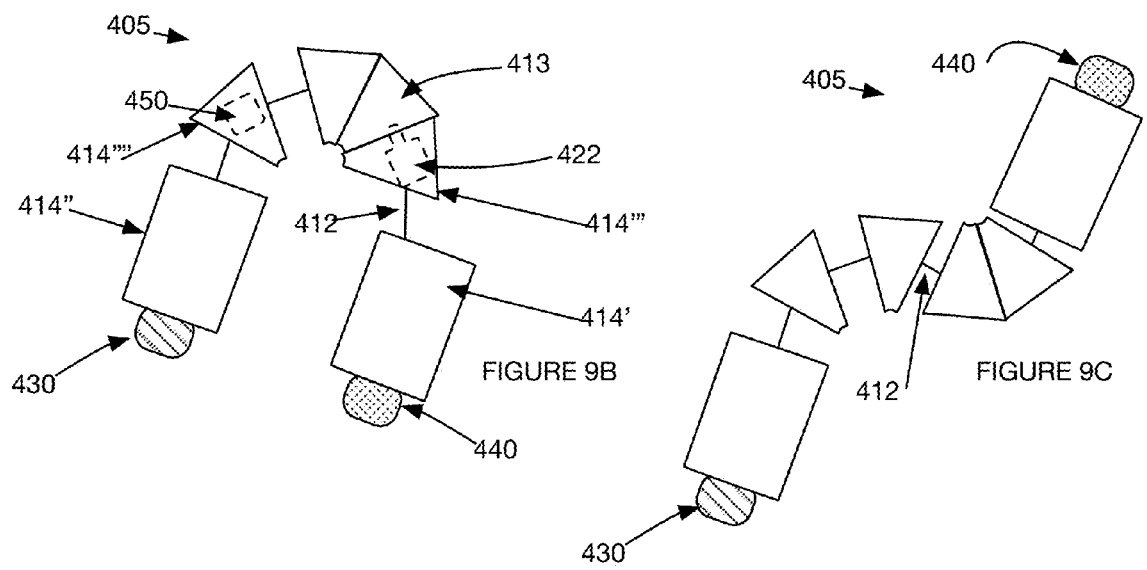
FIGURE 9B
FIGURE 9C

SYSTEM AND METHOD FOR PROVIDING CONTENT USING BEACON SYSTEMS

CROSS-REFERENCE TO RELATED APPLICATIONS

This application is a continuation-in-part of prior U.S. application Ser. No. 15/288,302 filed on 7 Oct. 2016, which is a continuation of U.S. patent application Ser. No. 14/956,209 filed 1 Dec. 2015, now issued as U.S. Pat. No. 9,491,586, which is a continuation of U.S. patent application Ser. No. 14/463,582, filed on 19 Aug. 2014, now issued as U.S. Pat. No. 9,202,245, which claims the benefit of U.S. Provisional Application No. 61/867,493, filed on 19 Aug. 2013 and to U.S. Provisional Application No. 61/867,498, filed on 19 Aug. 2013, all of which are incorporated in their entireties by this reference.

This application additionally claims the benefit of U.S. Provisional Application Ser. No. 62/393,903 filed on 13 Sep. 2016, U.S. Provisional Application Ser. No. 62/318,857 filed on 6 Apr. 2016, and U.S. Provisional Application Se. No. 62/296,254, filed on 17 Feb. 2016, which are each incorporated in their entireties by this reference.

This application is related to U.S. application Ser. No. 14/463,597 filed 19 Aug. 2014, which is incorporated in its entirety by this reference.

TECHNICAL FIELD

This invention relates generally to the wireless communication field, and more specifically to a new and useful system and method for providing contextual content in the wireless communication field. This invention relates generally to the portable display field, and more specifically to a new and useful portable card display in the information display field.

BRIEF DESCRIPTION OF THE FIGURES

FIGS. 9A-9C are schematic representations of examples of the beacon system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
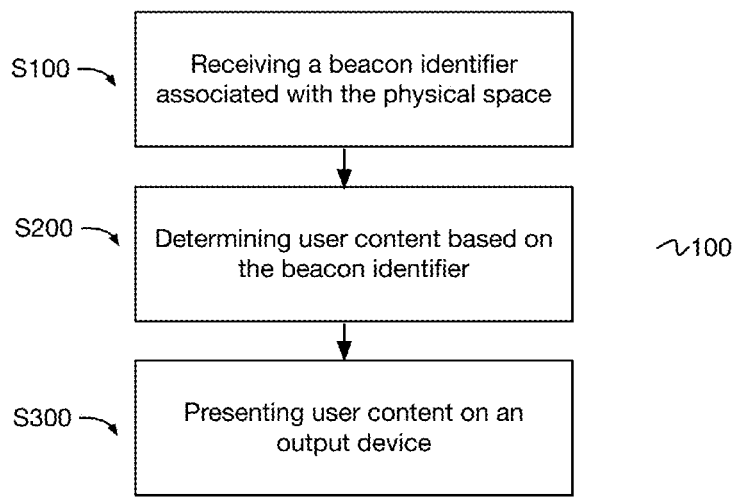
FIG. 1 is a schematic representation of the method.
Figure 2A:
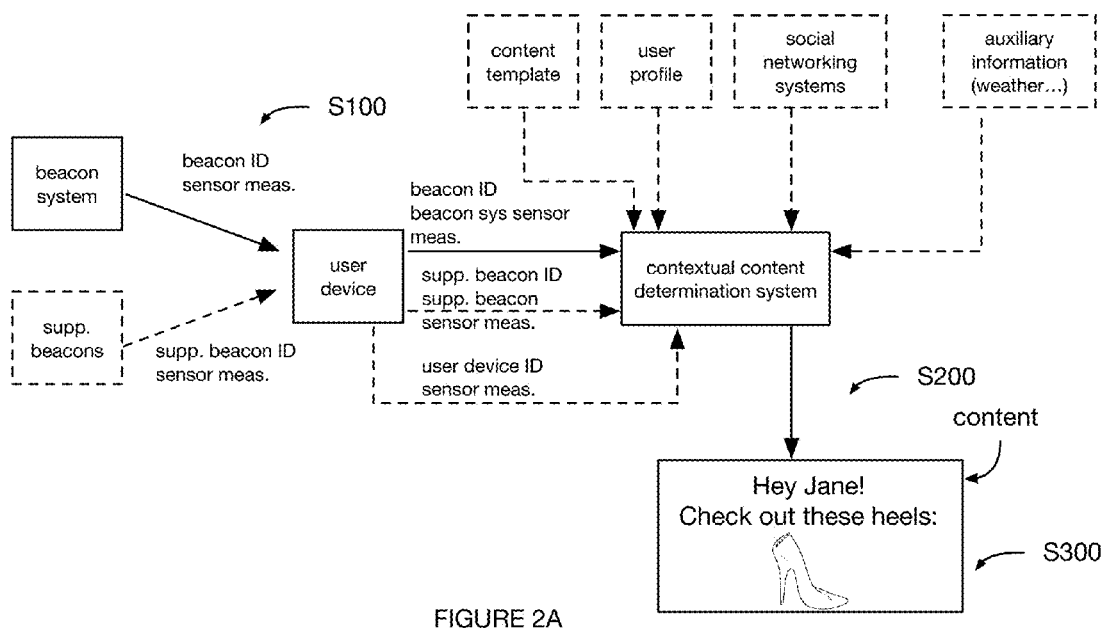
FIGS. 2A-2C are schematic representations of variations of the method for providing contextual content.
Figure 2B:
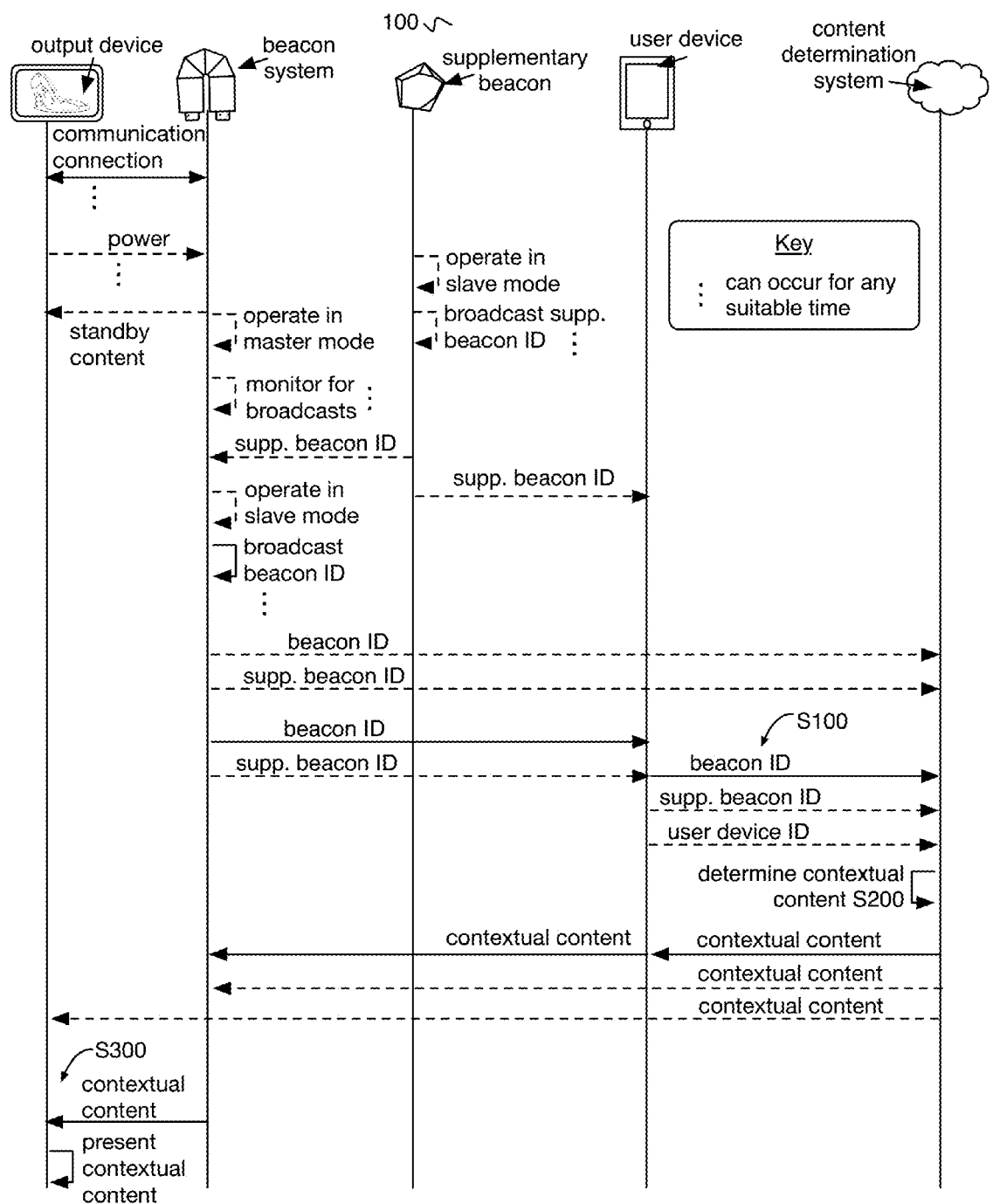
Figure 2C:
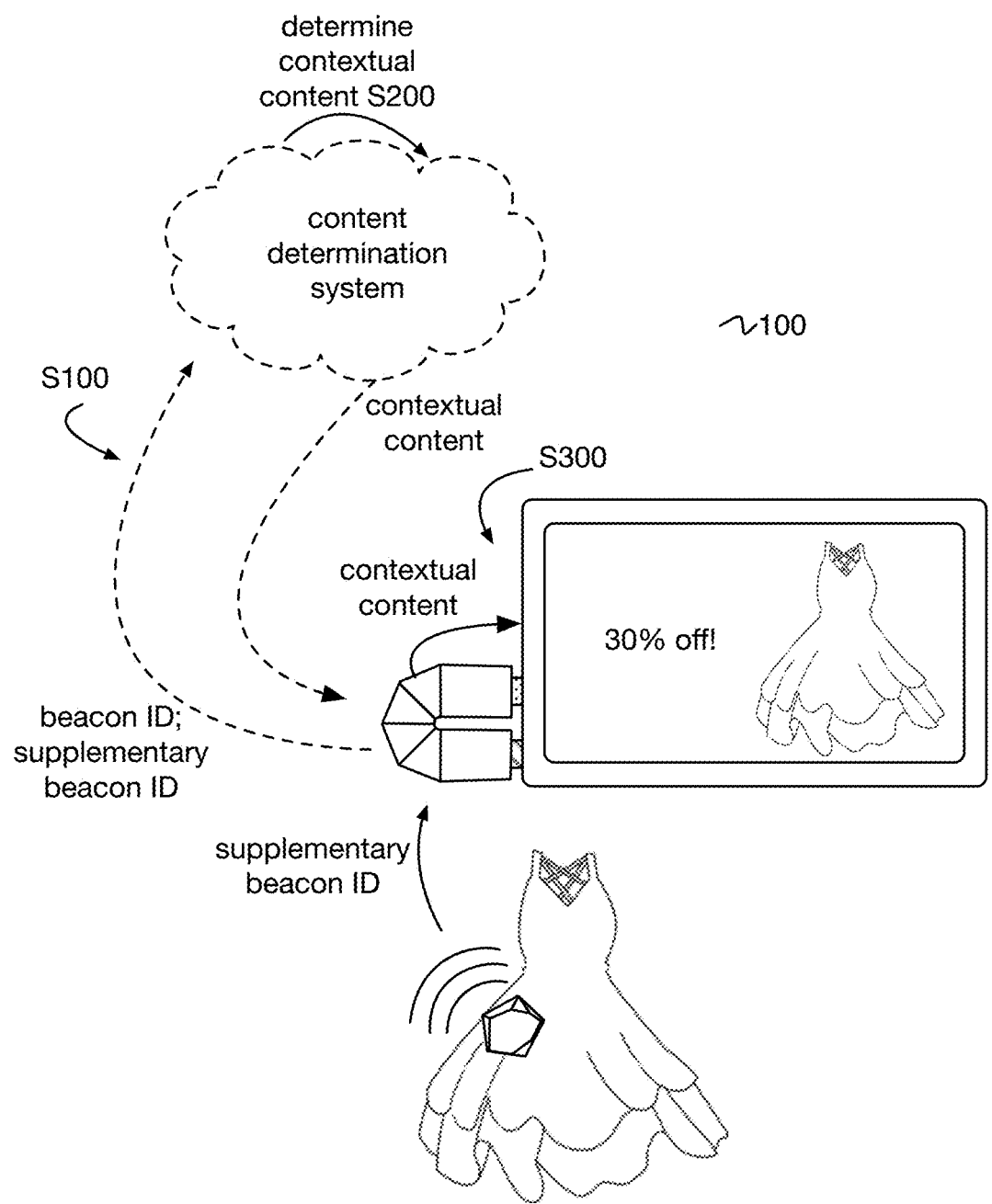

As shown in FIG. 1, the method 100 of providing contextual content using a beacon system includes: receiving a beacon identifier associated with a physical space S100; determining content (e.g., content contextualized for a user) based on the beacon identifier S200; and presenting the content on a display connected to the beacon system S300. The method 100 functions to present contextually-relevant content to a user on one or more screens in real- or near-real time.

2. Application Examples

In one variation of the method 100, a beacon system 405 is connected to a user output (e.g., display), where the beacon controls content presented by the output device. The output device can additionally power the beacon. Upon user device wireless connection with the beacon system 405 (e.g., upon user device entry into the beacon system's communication range), the beacon system 405 can wirelessly connect with the user device and control the output device to present contextual content specific to the user associated with the user device. Upon user device disconnection from the beacon system 405 (e.g., upon user device egress from the beacon system's communication range), the beacon system 405 can switch to operation in a standby mode, where the beacon system 405 controls the output device to present standby content (e.g., default content).

Figure 3:
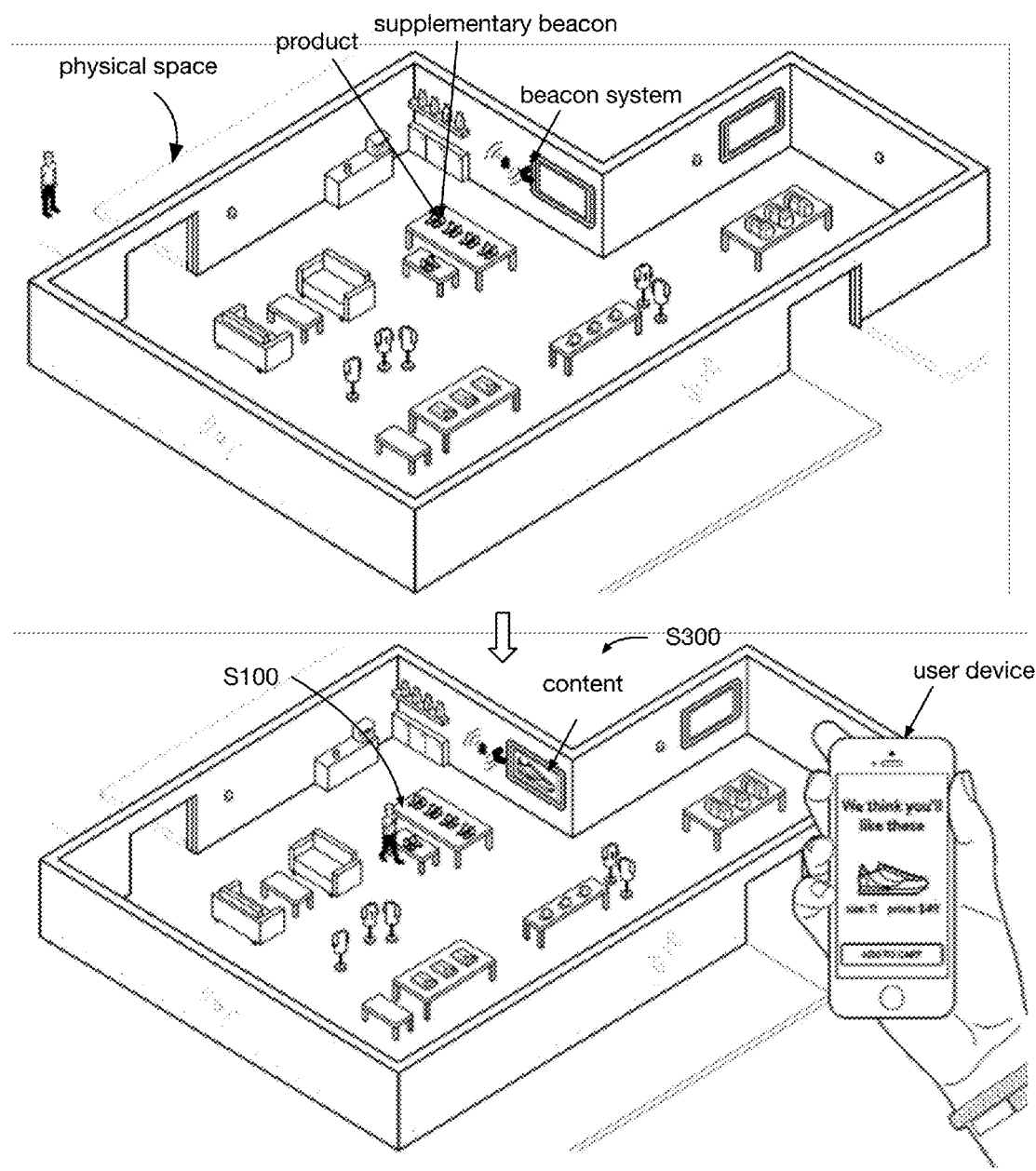
FIG. 3 is an illustration of an example of user interaction within a physical space including beacon systems and supplementary beacons.
Figure 4:
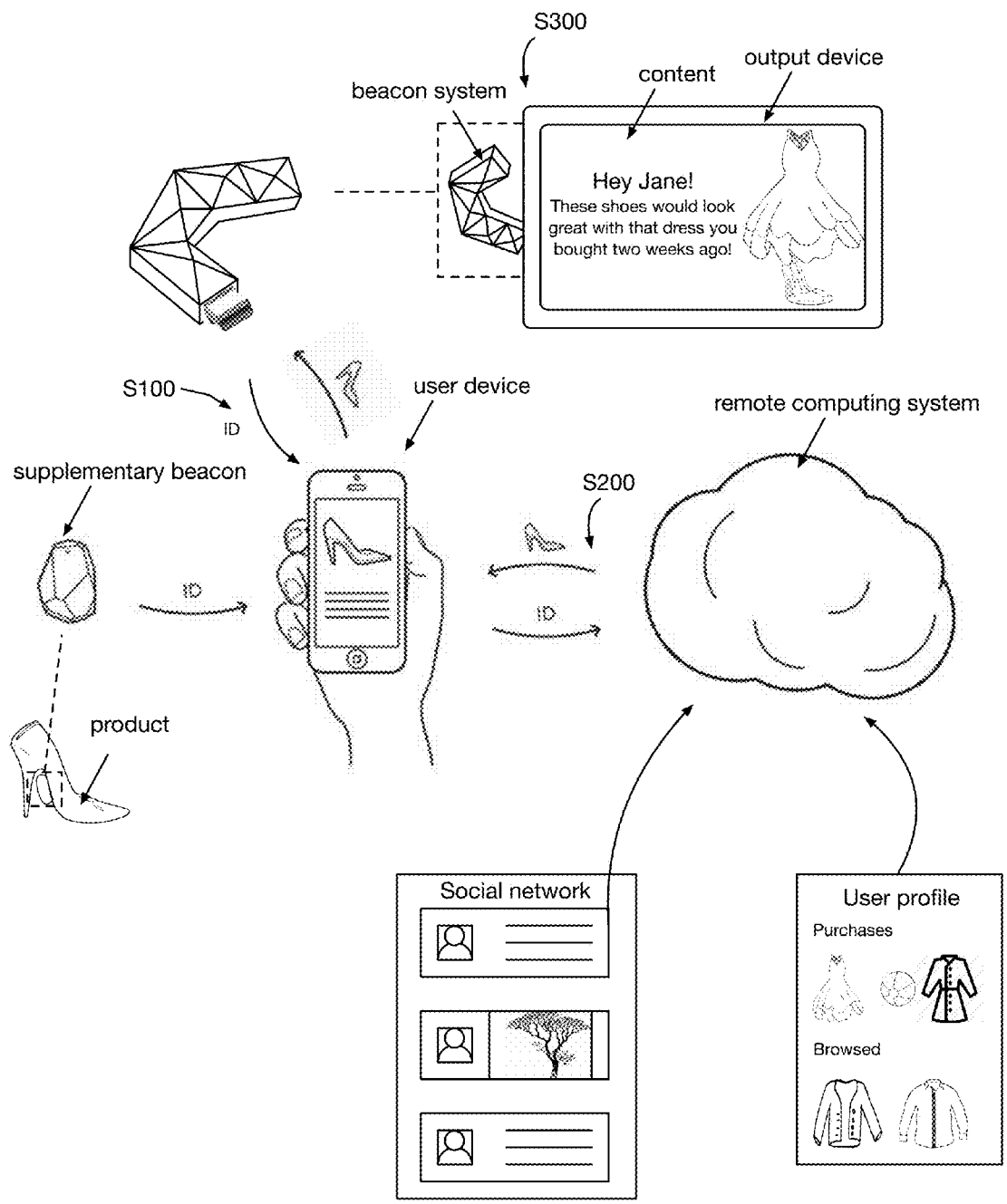
FIG. 4 is a schematic representation of an example of data flow between the beacon system, user device, remote computing system, and output device.

In a first example of the method 100 (example shown in FIG. 3), the beacon system 405 is plugged into a display (e.g., a television) within a physical retail store, where the beacon system 405 displays contextually-relevant retail content to a user proximal the beacon system 405. In a first specific example, the beacon system 405 can display product information, promotional videos, product comparisons, and/or other data about a product that a user is holding, where a product can be tagged with a supplementary beacon 408. In a second specific example, the beacon system 405 can display flight information to a user standing in front of the beacon system 405, where the flight information can be limited to the specific flight that the user is interested in (e.g., as determined based on the user's flight purchase information, emailed flight confirmations, etc.).

In the first example, the beacon preferably operates as a slave device in a standby mode and broadcasts a unique identifier associated with the beacon system 405. Upon user device entry into the beacon system's communication range, the user device receives the unique identifier from the beacon system 405, requests authorization to connect to the beacon system 405 from a remote computing system (e.g., remote server system), and connects to the beacon system 405 upon authorization. The user device can additionally be concurrently connected to, and receive data from (e.g., sensor data), supplementary beacon systems 408. Upon user device connection to the primary and supplementary beacon systems 408, the remote computing system can determine (e.g., generate, select, etc.) contextually-relevant retail content for the user and send the content to the beacon system 405 (e.g., directly to the beacon system 405 or indirectly, through the user device), where the beacon system 405 controls the display to display the contextually-relevant retail content to the user in near-real time.

Figure 7:
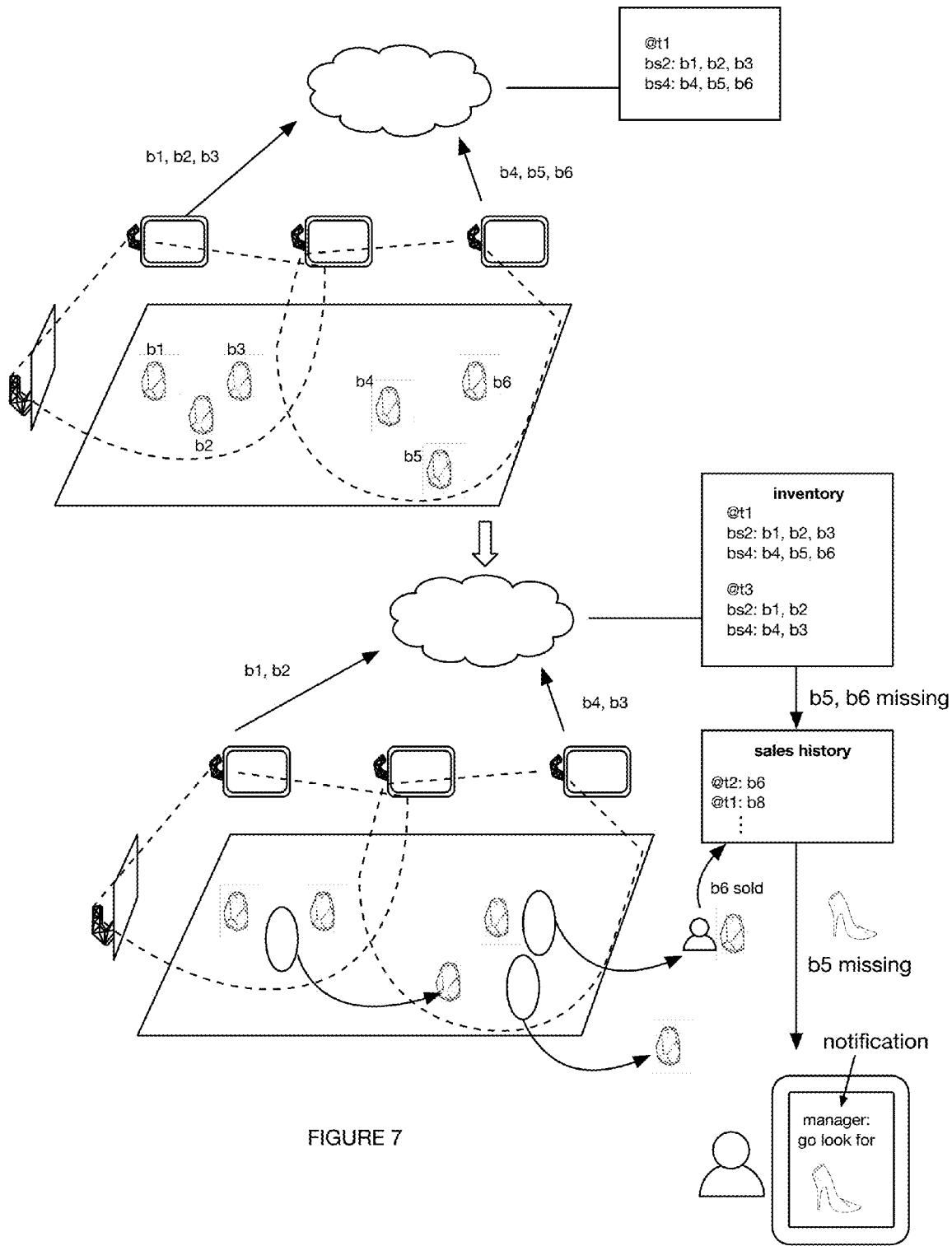
FIG. 7 is a schematic representation of an example of supplementary beacon monitoring with the beacon system.

Additionally or alternatively, the beacon system 405 can operate as a master device in the standby mode, and monitor (e.g., detect, scan), update, and/or otherwise manage supplementary beacon systems 408 within the physical area (example shown in FIG. 7). The beacon system 405 can additionally communicate the detected supplementary beacon identifiers to a remote computing system, where the remote computing system can compare the detected supplementary beacon identifiers (e.g., detected by a plurality of beacon systems within the same space) with the supplementary beacon identifiers that were expected to be detected within the space. The remote computing system can additionally generate a notification for the retail entity when an expected supplementary beacon identifier is absent from a space. However, the beacon system 405 can be used in any other suitable application in any other suitable manner.

In specific examples, the beacon system 405 can be used for presenting alerts, maps, and/or other relevant information to users. The beacon system 405 can be used in one or more of: urban landscapes (e.g., city maps depicting the geographic locations of destinations marked as favorites in a user device; alerts regarding nearby public transportation; etc.), arenas (e.g., maps of sports venues, concert venues, and/or other recreational venues to guide a user to the seat number designated in their user device, etc.), museums (e.g., providing user-tailored content for an exhibit), airports (e.g., multiple screens displaying personalized flight information and updates tailored to where the user is going as the user passes by the screens, etc.), industrial settings (e.g., presenting hands-free information such as schedules or tasks to industrial workers, etc.), events (e.g., presenting updates to agendas, etc.), meetings (e.g., displaying the tasks completed and the future action items for each of the individuals in the meeting, etc.), advertising (e.g., targeted advertising to consumers based on their user device information, etc.), and/or any other suitable applications.

3. Benefits

The beacon system can confer several benefits over conventional systems. First, the beacon system can be configured to receive and control the presentation of user-specific content on a connected user output, which functions to present curated, personalized information to the user in near-real time in a format different than that permitted by the user device.

Second, by using a short-range communication technology, the beacon system can be associated with a limited physical area. This can allow beacon connection with a user device to be used as a proxy for physical user proximity to the beacon and/or physical area associated with the beacon.

Third, in some variations, the beacon system can operate as a slave device when connected to the user device. This can function to limit the number of user devices concurrently connected to the beacon system, which can function to limit the presented contextual information to that of a single user. This can have the additional benefit of minimizing customer confusion. Fourth, in some variations, the beacon system application can motivate a user to leave the beacon system substantially constantly physically plugged into a power source (e.g., a display), which can remove the energy constraint encountered by conventional beacon systems. By removing this energy constraint, the beacon can transmit, scan, and/or perform other energy-intensive tasks at a higher frequency, even constantly.

Fourth, in some variations, a single beacon system can operate within a network of multiple supplementary beacons, user devices, applications executing on the user devices, output devices and/or any other suitable number of auxiliary devices. In some variations, multiple beacon systems can communicate within the network to schedule content display amongst corresponding output devices, display complementary content, and/or be used for any other suitable purpose.

Fifth, the technology can confer an improvement to the functioning of computer-related technology. In a first example, the technology can amount to an inventive distribution of functionality across a network of one or more: beacon systems (e.g., leveraging continuous power draw from the output device to support continuous broadcasting, monitoring of supplementary beacons, content transmission to the output device, and/or other suitable functions amounting to an improvement in the beacon system, etc.), supplementary beacons (e.g., offering portability by being able to be placed on different items, and contextual sensor data for determining contextual content), user devices (e.g., acting as a communication hub between the beacon system, supplementary beacons, and the content determination system), content determination systems (e.g., determining the contextual content), output devices (e.g., presenting the contextual content), and/or any other suitable components. In relation to the network, the technology can include determining supplementary beacon-output device interaction parameters (e.g., proximity, communication protocol, etc.), supplementary beacon—user device interaction parameters (e.g., proximity, relative motion), and/or any other interaction parameters. In a second example, the technology can facilitate performance of functions not previously performable (e.g., improving upon existing processes as opposed to applying a tool to perform an existing process). The technology can apply computer-implemented rules (e.g., content determination rules, beacon network communication rules, etc.) with improvements in beacon technology (e.g., the beacon system continuously drawing power from the output device in order to enable the power-intensive transmission of content to the output device; micro-location determination; beacon communication through Bluetooth Low Energy, etc.) to determine and deliver contextual content. In a third example, the technology can improve beacon network security, such as by limiting communication of the beacon system with user devices using cloud-based authentication, data-exchange protocols with enterprise-grade encryption and security algorithms, and/or applications implementing a first party (e.g., Estimote™) software development kit (SDK). In a fourth example, the technology can improve digital privacy associated with delivering contextualized content, such as by enabling permission-based user preferences for shared data, content determination, content presentation (e.g., permitting specific third party entities to display content; permitting specific content; controlling presentation parameters such as presentation duration; etc.).

Sixth, the technology can transform a particular article to another state or thing. For example, the technology can transform one or more of: an output device (e.g., controlling an output device to display standby content and/or contextual content using the beacon system, etc.), a beacon system (e.g., controlling the beacon system to operate between master and slave modes to fulfill different purposes, etc.), and/or other suitable components.

However, the technology can provide any other suitable benefits in the context of using non-generalized systems for contextualizing and/or delivering content.

4. Auxiliary Devices

The method 100 is preferably performed in whole or in part with one or more auxiliary devices, which can include any one or more of: output devices, user devices, remote computing systems, supplementary beacons 408, merchant devices (e.g., point-of-sale devices, merchant smartphones, merchant appliances, etc.), and/or any other suitable auxiliary devices. The system 400 can include or omit auxiliary devices.

The method 100 can be performed in whole or in part with an output device, which functions to output data provided by the beacon system 405. The output device can additionally function to output any other suitable information. The output device is preferably an output display, but can be any suitable output device. The output device is preferably associated with a third party entity (e.g., a retailer, airport, etc.), but can additionally or alternatively be associated with a user, application provider (e.g., developer), and/or any other suitable entity. The output device is preferably physically connected to the beacon system 405 (e.g., the data connector 440 of the beacon system 405), but can additionally or alternatively wirelessly connect to the beacon system 405 and/or otherwise connect to the beacon system 405. The output device is preferably statically mounted to a wall, door, and/or other physical boundary of a physical space, where the beacon is associated with the physical position of the output device within the physical space. Alternatively, the output device can be mobile, such that the beacon-display assembly functions as a roaming contextual device. Examples of the output device include a display, microphone, and/or any other suitable user output. Examples of the display include: a television, projection system, speakers, and/or any other suitable output system capable of presenting information. However, the output device can be otherwise configured.

The method 100 can additionally be performed in whole or in part with a user device, which functions to detect and/or temporarily connect to the beacon system 405 when physically proximal the beacon system 405. The user device can additionally function to concurrently detect and/or temporarily connect to one or more supplementary beacon systems 408. The user device can additionally function to send and/or receive data from a remote computing system, send and/or receive data from the beacon system 405 and/or supplementary beacons 408, generate the contextual content, and/or perform any other suitable functionality. The user device can be a tablet, smartphone, smartwatch, mobile phone, laptop, watch, wearable device (e.g., glasses), and/or be any other suitable user device. The user device preferably includes power storage 460 (e.g., a battery) and a processor, and can additionally include a display, a user input (e.g., a keyboard, touchscreen, accelerometer, microphone, etc.), a location system (e.g., a GPS system), a data communication system (e.g., a WiFi module, cellular module, etc.), and/or any other suitable component. The user device can execute one or more native applications, where one or more of the native applications can be associated with the third party entity. However, the user device can be otherwise configured.

The method 100 can additionally be performed in whole or in part with a content determination system (e.g., remote computing system), which functions to control application access permissions to the beacon system 405 and/or user information, generate contextual content, transmit contextual content, manage beacon identifiers, and/or perform any other suitable functionality. The content determination system preferably includes a remote computing system, which can include a remote server system, but can alternatively be a set of user devices (e.g., a distributed network of user device), a set of beacon systems, and/or be any other suitable set of networked computing systems. However, the content determination system can be otherwise configured.

The method 100 can additionally be performed in whole or in part with one or more supplementary beacons 408, which function to identify physical objects and/or locations within the physical space. The supplementary beacons 408 preferably function as slave devices, but can constantly or periodically function as master devices as well. The supplementary beacons 408 are preferably identified by a unique supplementary beacon identifier, but can alternatively be otherwise identified. The supplementary beacons 408 preferably broadcast the supplementary beacon identifier periodically, continuously, when a trigger event occurs, and/or at any other suitable time. The broadcast supplementary beacon identifier can be received by the user device, beacon system(s), other supplementary beacons 408, and/or by any other suitable device proximal the supplementary beacon 408. In a variation, the broadcast supplementary beacon identifier can include supplementary beacon sensor data. In another variation, the supplementary beacon 408 can broadcast sensor data and/or other suitable data independently of the supplementary beacon identifier. The supplementary beacons 408 can include a radio 420 (e.g., sharing the same band or technology as the beacon system 405), power source 430 (e.g., battery), sensors (e.g., accelerometers, gyroscopes, temperature sensors, etc.), mounting mechanism (e.g., adhesive), and/or any other suitable component. Additionally or alternatively, the supplementary beacon 408 can be defined in any manner analogous to that described in U.S. application Ser. No. 15/288,302 filed on 7 Oct. 2016. However, supplementary beacons 408 can be configured in any suitable manner. Further, any type of auxiliary device can be configured in any suitable manner.

5. Beacon System

Figure 11:
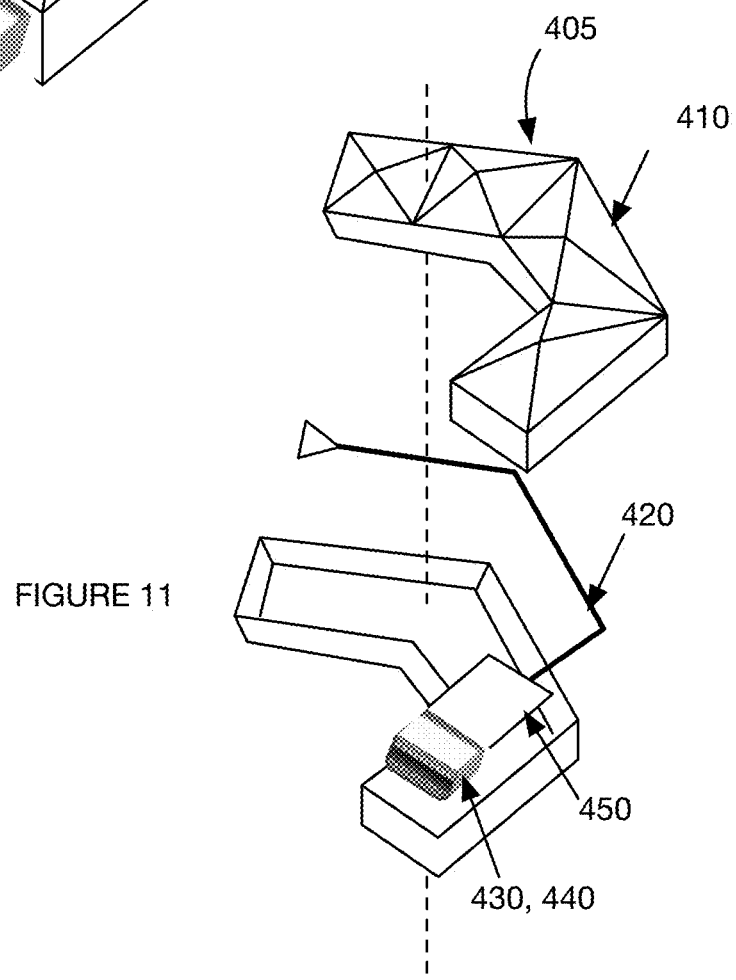
FIG. 11 is an exploded view of the example beacon system of FIG. 10.

As shown in FIGS. 9A-9B and 11, the system 400 can include a beacon system 405 including one or more: radios 420, power sources 430, a data connector 440, and a processing system 450. In an embodiment, the beacon system 405 can include: a flexible housing 410 defining a first end and a second end; a radio 420 encapsulated by the flexible housing 410 between the first and the second ends; a data connector 440 mounted to the first end of the flexible housing 410, the data connector 440 configured to removably connect to an output display; a power source 430 (e.g., power connector) mounted to the second end of the flexible housing 410, the power source 430 configured to removably connect to the output display; and processing system 450 electrically connected to the radio 420, the data connector 440, and the power source 430, the processing system 450 encapsulated by the flexible housing 410 between the first and the second ends.

The system 400 functions to present contextually-relevant content to a user on one or more screens in real- or near-real time. However, the method 100 can be performed with any other suitable system. The system 400 can additionally function to monitor slave beacons within the physical space, such that missing beacons can be automatically identified and reported to an entity associated with the physical space. The system 400 can additionally manage slave beacons within the physical space, such as by pushing updates to the slave beacons, receiving operation data from the slave beacons, forwarding slave beacon data (e.g., accelerometer data, etc.) to the remote computing system, and/or otherwise managing the slave beacons within the space. The system 400 can additionally function as a substantially static physical marker, such that a user to easily create geofences within the physical space using the relative member locations of a beacon population. The system 400 can additionally function as a repeater or node of a mesh network, such that the system 400 can physically extend the data connectivity and transmission range of a beacon population. However, the system 400 can perform any other suitable function.

The beacon system 405 is preferably operable between one or more modes. In one example, the beacon system 405 can be operable between: a standby mode, when the beacon system 405 is not connected to any user devices and/or supplementary beacons 408, and a connected mode, when the beacon system 405 is connected to one or more: user devices and/or supplementary beacons 408. The beacon system 405 preferably functions as a slave device in both modes, but can additionally or alternatively function as a master in one or both modes. The beacon system 405 can additionally or alternatively be operable in a monitoring mode, where the beacon system 405 can function as a master device and scan for supplementary beacon identifiers within the beacon system's communication range. The beacon system 405 can be periodically switched between the operation modes, change operation modes in response to the occurrence of a trigger event (e.g., user device connection), and/or change operation modes in any other suitable manner. System operation mode transition can be controlled by: the beacon system 405 itself, the beacon system 405, the remote computing system, the user device, a supplementary beacon 408, a combination thereof, and/or be controlled by any other suitable computing system. In a variation, the beacon system 405 can operate concurrently in a plurality of modes using a plurality of radios (e.g., one for each mode). For example, the beacon system 405 can concurrently operate in a connected mode (e.g., connected to a user device), a monitoring mode (e.g., monitoring for broadcasts of supplementary beacon identifiers from supplementary beacons 408), and a broadcasting mode (e.g., broadcasting a beacon identifier identifying the beacon system 405 in a slave mode). However, the beacon system 405 can be operable in any number of and/or types of suitable modes using any suitable number of radios.

The beacon system 405 is preferably identified by one or more beacon identifiers. The beacon identifier can be locally unique, globally unique, or non-unique. The beacon identifier can be public, private, semi-private (e.g., available to many, but not all, user accounts or applications), and/or have any other suitable set of permissions. In one variation, the beacon system 405 is preferably identified by both a temporary short identifier and a permanent long identifier, where the short identifier is broadcast and/or otherwise sent to other devices and the permanent long identifier is used by the beacon identifying system to uniquely identify the beacon system 405. Alternatively, the beacon system 405 can be associated with a single identifier. When the identifier is temporary, the identifier or rules for identifier generation can be assigned to the specific beacon system 405 by the identifying system, and/or be otherwise determined. The one or more beacon identifiers can be modified (e.g., customized to a custom identifier; to include beacon sensor data; etc.) by an authorized entity (e.g., a third party entity owning the beacon tracked for identified by the beacon identifier). Modifications to beacon identifiers can be tracked by the content determination system (e.g., by associating the modified beacon identifier with content for display at an output device). In a specific example, the beacon identifier can be managed in the manner disclosed in U.S. application Ser. No. 14/463,597 filed 19 Aug. 2014, which is incorporated in its entirety by this reference. In a variation, the different beacon identifiers can be associated with different content (e.g., to be displayed at a corresponding output device). For example, the system 400 can include a first beacon system 405' identified by a first beacon identifier associated with a first content template, and a second beacon system 405" identified by a second beacon identifier associated with a second content template. However, beacon identifiers can be otherwise defined and/or managed.

The radio 420 of the beacon system 405 functions to transmit and/or receive data. The data can include a unique identifier identifying the beacon system 405, unique identifiers identifying supplementary beacons 408, beacon system parameters (e.g., beacon sensor data, beacon operation history, etc.), content data, and/or any other suitable data. The data can be transmitted to and/or received from: the user device, the remote system, a supplementary beacon 408, a second beacon system 405", the output device, and/or any other suitable endpoint. The data can be broadcast or advertised (e.g., to any listening or scanning device), sent to a targeted endpoint, and/or be otherwise communicated. The beacon system 405 preferably includes one or more radios 420, where multiple radios 420 can be of the same or different type (e.g., a Bluetooth radio and a WiFi radio). The radio 420 is preferably for a short-range communication technology, but can additionally or alternatively be for a long-range communication technology. Examples of the radio 420 include: a Bluetooth radio (e.g., Bluetooth low energy radios), a WiFi radio, a WLAN radio, a WiMAX radio, a Zigbee radio, a NFC radio, and/or any other suitable short or long range repeater, extender, protocol translator, and/or other suitable means for conducting a one-way or two-way communication protocol. In a specific example, the radio includes a 2.4 GHz BLE radio. The beacon system 405 can include any number of radios typifying any suitable type. In a specific example, as shown in FIG. 9A, the beacon system 405 can include two BLE radios, 420', 420" (e.g., a first BLE radio operating in slave mode, a second BLE radio concurrently operating in master mode, etc.) and a WiFi radio 420''' (e.g., configured to communicate with the content determination system, auxiliary devices, and/or other suitable components; configured to retrieve contextualized content from the Internet; etc.). However, the radio 420 can be configured in any suitable manner.

The radio 420 preferably includes a transceiver and an antenna 422, but can additionally or alternatively include any other suitable component. The transceiver can be integrated in to the processing system 450, or be separate. The antenna 422 can extend along the beacon system length (e.g., along the longitudinal axis, along the inner or outer perimeter, etc.), extend along the beacon system width, and/or extend along any other suitable portion of the beacon system 405. In a specific example, the radio 420 can be arranged within a rigid segment of the flexible housing, where the radio 420 includes an antenna extending through a flexible segment of the flexible housing. The antenna 422 is preferably arranged distal the data connector (e.g., to avoid electromagnetic interference), but can alternatively be arranged proximal the data connector 440 and/or be arranged in any other suitable location on the beacon system 405. However, the radio 420 can include any suitable components configured in any suitable manner.

The power source 430 of the beacon system 405 functions to power the beacon system components. The power source 430 is preferably wired to the powered components, but can alternatively be wirelessly connected to the powered components (e.g., via induction). The beacon system 405 can include one or more power sources 430 of the same or different type. In a first variation, the power source 430 is a battery housed within the beacon system 405. The battery is preferably a secondary battery (e.g., rechargeable battery), but can alternatively be a primary battery or be any other suitable battery. Examples of the battery can include lithium chemistry batteries, nickel cadmium batteries, CR2477 batteries, or any other suitable battery. As shown in FIGS. 9A-9B, in a second variation, the power source 430 is a power connector configured to plug into an external power source 430. The power connector can be integrated with the data connector 440 (e.g., a single connector providing charging and data transmission capabilities), but can alternatively be a separate power connector. Examples of the power connector include: a USB connector (e.g., Micro-USB, USB Type-C, etc.), Lightning connector, a wall outlet plug, a set of pins, an induction coil, and/or any other suitable power connector. However, the beacon system 405 can include any other suitable power source 430 configured in any suitable manner.

The data connector 440 of the beacon system 405 functions to transfer data from the beacon system 405 to the output device. The data connector 440 can additionally or alternatively function to receive data from the output device, function as a structural component that mounts the beacon system 405 to the output device, function to power the beacon system components, and/or perform any other suitable functionality. The beacon system 405 can include one or more data connectors 440 of the same or different type. The data connector 440 is preferably wired, but can alternatively be wireless. The data connector 440 can include: a video connector, an audio connector, and/or a connector for any other suitable data. The data connector 440 is preferably arranged along a first end of the beacon system 405, but can alternatively be arranged along the beacon system body and/or along any other suitable portion of the beacon system 405. Examples of the data connector 440 include an HDMI connector, Thunderbolt' connector, VGA connector, Apple™ display connector, DVI connector, antenna plug, NBC connector, C connector, GR connector, DIN connector, RCA connector, audio jack, and/or any other suitable connector. However, the data connector 440 can be configured in any suitable manner.

The processing system 450 of the beacon system 405 functions to control unique identifier broadcasting, control data transfer between the beacon system 405 and the user device, control data transfer between the beacon system 405 and remote computing system, manage beacon system operation between the set of operation modes, and/or perform any other suitable functionality. The beacon system 405 can include one or more processing systems 450 of the same or different type. The processing system 450 can be a CPU, GPU, microprocessor, or be any other suitable processing system 450. The processing system 450 can additionally include memory (e.g., RAM, flash), and/or include any other suitable component. In a variation, the processing system 450 can function to determine contextual content to transmit to the output device to serve to a user. In this variation, the beacon system 405 can act as the content determination system. In an example, the processing system 450 can receive supplementary beacon information (e.g., supplementary beacon identifiers, supplementary beacon parameters, etc.) and/or user device information (e.g., user device identifiers, application identifiers, sensor data, etc.) transmitted to the beacon system 405 (e.g., at the radio); determine contextual content (e.g., extracting values from the supplementary beacon information and/or user device information; fill content templates stored at storage 460 of the beacon system 405 with the values; etc.), and transmit the contextual content to the output device (e.g., through a wired HDMI connector). In another variation, the processing system can 450 can determine default standby content to transmit to the output device. In another variation, the processing system manages beacon identifier broadcasting and/or receipt, wherein content determination is performed by a remote computing system (e.g., server system). However, the beacon system 405 can otherwise perform any suitable functionality associated with the content determination system.

The beacon system 405 and/or supplementary beacons 408 can additionally include a set of sensors that function to monitor beacon operation parameters (e.g., beacon system parameters, supplementary beacon parameters). Beacon operation parameters can include beacon parameters (e.g., power storage SOC, user connection frequency, connection status to other devices, internal temperature, physical orientation, etc.), environmental parameters (e.g., ambient temperature, ambient light, ambient noise, etc.), motion parameters, and/or include any other suitable parameter. The beacons (e.g., beacon system 405, supplementary beacons 408, etc.) can include one or more sensors of the same or different type. The sensors can include one or more of: an accelerometer, gyroscope, altimeter, microphone, transducer, temperature sensor, light sensor, and/or be any other suitable sensor.

Figure 10:
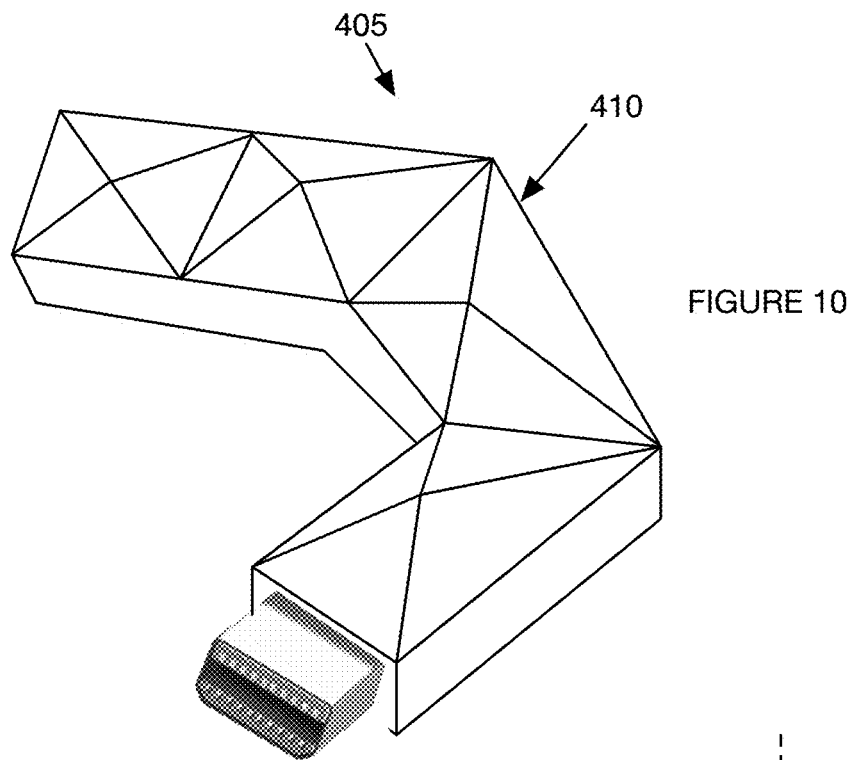
FIG. 10 is a schematic representation of an example of the beacon system.

As shown in FIG. 10, the beacon system 405 can additionally include a housing 410, which functions to mechanically encapsulate, mount, and protect the beacon system components. The housing 410 can be made of plastic, metal, ceramic, rubber, and/or from any other suitable material. The housing 410 is preferably substantially flexible (e.g., as shown in FIG. 9B-9C), but can alternatively be substantially rigid or include a combination of flexible and rigid components. A flexible housing can enable the beacon to be installed in output systems with different power source 430 and data connector 440 configurations (e.g., accommodate a plurality of different power source 430 and data connector 440 arrangements). In a variation, the housing 405 can include multiple rigid segments 414. The multiple rigid segments 414 can form one or more lines, curves (e.g., sinusoidal, boustrophedonic, S-shape, etc.), U-shape (e.g., as formed by a first, second, third, and fourth rigid segment), and/or any other suitable geometric shape. In an example as shown in FIG. 9A, the rigid segments 414 can form a U-shape where a protrusion axis 416' of a power connector connected to a first end of the housing 410 is substantially parallel a protrusion axis 416" of a data connector 440 connected to a second end of the housing 410. The active connector ends (e.g., opposing the connector end mounted to the PCB or encased within the housing) can be directed in the same direction (e.g., codirectional), directed such that projections of the respective normal vectors onto a common plane are codirectional and/or parallel, antidirectional, directed at an angle to each other (e.g., perpendicular, etc.), or otherwise arranged. One or more rigid segments 414 can be connected to other segments with a flexible bus 412. Each rigid segment 414 can include one or more of the beacon components (e.g., data connector 440, power source 430, antenna 422, etc.). As shown in FIG. 9B, in a specific example, the housing 410 can include a first rigid segment 414' defining a first end; a second rigid segment 414" defining the second end, where the data connector 440 is mounted to the first rigid segment 414' and the power source 430 (e.g., power connector) is mounted to the second rigid segment 414"; and a flexible bus 412 electrically connecting the data connector 440 and the power source 430. In this specific example, the housing 410 (e.g., flexible or articulated housing, example shown in FIG. 9C) can include a third and a fourth rigid segment 414", 414"" connected between the first and second rigid segments 414', 414" by a flexible segment 413, where a radio 420 is arranged within the third rigid segment 414'" and the processing system 450 is arranged within the fourth rigid segment 414"", where the flexible bus 412 electrically connects the data connector 440, the power source 430, the radio 420, and the processing system 450, and where the flexible bus 412 extends through the flexible segment 413. Additionally or alternatively, the beacon components can be flexible themselves. However, the housing 410 can be otherwise configured.

Additionally or alternatively, the beacon system 405 can be integrated (e.g., built into) the output. However, the beacon system 405 can include any other suitable component (e.g., storage 460), and/or be configured in any suitable manner.

6. Method

As shown in FIGS. 1, 2A-2C, and 4, the method 100 of providing contextual content using beacons includes: receiving a beacon identifier associated with a physical space S100; determining content (e.g., contextual content) based on the beacon identifier S200; and presenting the content on an output device connected to the beacon system S300.

In a first embodiment, the method 100 for personalizing and delivering content using beacons can include, while a beacon system is communicably coupled to an output display: a) broadcasting a beacon identifier identifying the beacon system from the beacon system to a user device; b) receiving the beacon identifier (and/or user identifier) at a content determination system from the user device; c) determining contextual content at the content determination system based on the beacon identifier (and/or user identifier); d) transmitting the contextual content from the content determination system to the user device, where the user device automatically transmits the contextual content to the first beacon system in response to receiving the contextual content; e) receiving the contextual content at the beacon system from the user device; and f) controlling the output display with the beacon system to present the contextual content. In this or other embodiments, any portions of the method 100 can be performed concurrently, serially, and/or in any suitable temporal relationship with other portions of the method 100. For example, in the first embodiment, the method 100 can include: concurrently with performing a) through f), continuously broadcasting the beacon identifier with the beacon system for receipt by a second user device.

In a second embodiment, the method 100 can include, while a beacon system is drawing power from an output display through a wired connection: receiving, at a content determination system, a beacon identifier identifying a beacon; determining contextual content with the content determination system based on the beacon identifier; receiving the contextual content at the beacon system; and sending the contextual content from the beacon system to the output display through a second wired connection. In this embodiment, the beacon can be the beacon system, a supplementary beacon, and/or other suitable beacon. Additionally or alternatively, the content determination system can be the beacon system, a remote computing system, and/or other suitable component.

The method 100 functions to present contextually-relevant content to a user on one or more screens in real- or near-real time. The method 100 can additionally function to monitor slave beacons within the physical space, such that missing beacons can be automatically identified and reported to an entity associated with the physical space, updates can be pushed to the slave beacons, slave beacon operation data can be received from the slave beacons, and/or perform any other suitable functionality. The method 100 is preferably performed using the system described above, but can additionally or alternatively be used with any other suitable system.

Receiving a beacon identifier associated with a physical space S100 functions to associate the user device with beacon system, such that targeted content can be generated for the user associated with the user device. Receiving the beacon identifier can additionally function to associate the user device with the physical location or volume proximal the beacon system. The beacon identifier is preferably received by a content determination system (e.g., remote computing system), but can additionally or alternatively be received by any other suitable endpoint. The content determination system can receive the beacon identifier from the master device (e.g., the beacon system or the user device, etc.), an intermediate entity (e.g., an application executing on the master device, the output device, etc.), and/or from any other suitable endpoint. The beacon identifier is preferably a beacon packet using the beacon protocol, but can alternatively be audio patterns, light patterns, and/or any other suitable signal emitted by the beacon or by a connected output device. However, the unique identifier can be received in any other suitable manner.

Receiving the beacon identifier can additionally or alternatively include receiving a user device identifier, which functions to identify the user associated with the user device. The user device identifier is preferably received by the content determination system via the master device (e.g., the user device or the beacon system), but can additionally or alternatively be received by any other suitable endpoint. In a first variation in which the user device is the master device, the user device can send the user device identifier with the received beacon identifier to the content determination system. The user device can additionally send an entity identifier associated with an entity (e.g., Nike™) or application identifier for the application that received the beacon identifier (e.g., Nike™ application) to the content determination system. In a second variation in which the beacon system is the master device, the beacon system can send the received user device identifier to the content determination system with the beacon identifier. However, the user device identifier can be otherwise received.

The method 100 can additionally or alternatively include receiving a supplementary beacon identifier, which functions to identify that a physical object or location associated with the supplementary beacon is proximal the master device. The supplementary beacon identifier is preferably received by the content determination system via the master device (e.g., the user device or the beacon system), but can additionally or alternatively be received by any other suitable endpoint. In an example, the method 100 can include continuously monitoring (e.g., with a beacon system; with the master device; etc.) for beacon identifiers (e.g., supplementary beacon identifiers broadcast by a supplementary beacon; other beacon system identifiers; etc.), which can be performed concurrently with any other suitable portion of the method 100. The supplementary beacon identifier is preferably received from within a predetermined time frame from beacon identifier receipt (e.g., 1 minute before or after beacon identifier receipt), but can alternatively be received outside of the time frame. The predetermined time frame is preferably equal to or otherwise determined based on the broadcasting frequency of the supplementary beacon or beacon system, but can be manually set or otherwise determined. The supplementary beacon identifier is preferably received from the same master device, but can additionally or alternatively be received from a different device. In a first variation in which the user device is the master device, the user device can detect both the supplementary beacon and beacon system (concurrently or serially) and send the respective identifiers to the content determination system (concurrently or serially). In a second variation in which the beacon system is the master device, the beacon system can detect the user device and/or the supplementary beacon (concurrently or serially). In this variation, the respective information (e.g., user device information, supplementary beacon information, etc.), can be transmitted from the beacon system to the content determination system (e.g., concurrently or serially; directly or indirectly such as through the user device); used by the beacon system in directly determining contextual content (e.g., where the beacon system acts as the content determination system); and/or used in any suitable manner. However, the supplementary beacon identifier can be otherwise received.

Receiving the supplementary beacon identifier can additionally include receiving supplementary beacon parameters (e.g., supplementary beacon sensor data), which functions to provide context about the physical object or location tagged with the supplementary beacon. In one example, the supplementary beacon parameters can be used to determine whether a user (associated with the user device) has physically picked up a product tagged with the supplementary beacon. However, receiving supplementary beacon parameters can be otherwise performed.

Determining content S200 functions to select or generate contextual content relevant to a user. The content (e.g., contextual content) is preferably automatically determined by the content determination system, but can alternatively be manually selected or determined by any other suitable system. The content determination system can be the remote computing system, the user device, the beacon system, a supplementary beacon, combination of the above, and/or any other suitable computing system.

The content can be determined using machine learning techniques (e.g., regression, classification, etc.), probabilistically, deterministically, and/or otherwise determined. When machine learning techniques are used, the machine learning modules can be updated periodically; in response to and based on subsequent user action (or non-action), as determined based on the user purchase history; or updated in any other manner at any suitable time. The content is preferably generated, but can alternatively be selected from a predetermined set of content, or be otherwise determined. The content is preferably generated from the predetermined set of content pieces, but can alternatively or additionally be generated from social network streams (e.g., associated with the product entity, physical space entity, user, etc.) and/or any other suitable content source. The predetermined set of content pieces can include stock images, content templates, or any other suitable set of content. The predetermined set of content pieces can be received from a third party (e.g., an entity associated with the physical space, product, output device, advertiser, etc.), and/or be otherwise provided. The content can be generated using machine learning techniques (e.g., regression or classification), using a predefined formula, and/or be otherwise generated. The content can be generated based on one or more of: beacon system information (e.g., beacon identifier, beacon system parameters such as beacon system location and/or beacon sensor data), entity associated with the beacon (e.g., the merchant), entity preferences associated with the entity, entity associated with the application executing on the user device, the identifier for the application executing on the user device, user device information (e.g., sensor data, user device identifier; can be read from user device or sent by user device to server), user profile associated with the user device (purchase history, preferences, physical browse history, upcoming flights, automatically generated from social media, etc.), supplementary beacon information (supplementary beacon identifier, supplementary beacon parameters, etc.), interaction duration, general contextual information (e.g., time of day, weather, etc.), user contextual information (e.g., calendar, social media, etc.), and/or any other suitable information.

In a first variation, the content is determined based on beacon system information (e.g., beacon identifiers, beacon system parameters, etc.). In a first embodiment, the content is determined from the predetermined set of content or content pieces associated with the beacon identifier. In this embodiment, the content determination system can store the predetermined set of content or content pieces in association with the beacon identifier and/or otherwise access the predetermined content set. For example, a video for a retail store can be selected for a beacon identifier associated with the retail store. In a second embodiment, the content is generated based on content or content pieces associated with a context, where the context is associated with the beacon identifier. The context can be provided by the third party, be automatically determined (e.g., based on subsequent user device history after beacon connection or beacon identifier detection), and/or be otherwise determined. For example, a cooking video can be selected for a beacon identifier associated with kitchens. However, determining content based on beacon system information can be performed in any suitable manner.

In a second variation, the content is generated based on user device information (e.g., user device identifiers, application identifiers, sensor data, etc.). In a first embodiment, the beacon identifier is associated with the content template and types of content to retrieve, and the user device identifier is associated with the content source. The content source can be: a social network stream (e.g., the social network account associated with the user device), a social network (e.g., connections of the user on the social network account), content associated with the user purchase history or user browsing history (e.g., based on the products associated with supplementary beacons that the user had historically interacted with, picked up, loitered near, etc.), and/or be any other suitable content source. In this embodiment, determining the content can include filing out the template with content from the content source. For example, in response to receipt of a beacon identifier associated with a retail brand, the system can generate a composite image from photographs of the user's friends wearing the brand products extracted from the user's social networking system content stream.

In a second embodiment of the second variation, the beacon identifier can be associated with a set of content, and the user device identifier can be associated with a data source, where the content is selected from the set of content based on parameters extracted from the data source. The set of content can be provided by the third party, retrieved from the content source as discussed above, and/or be any other suitable content. The data source can include: the content source as discussed above, a user profile (e.g., manually entered by the user, automatically generated, etc.), a calendar associated with the user, communiqué associated with the user (e.g., emails), and/or any other suitable data source.

The data source can be stored by the content determination system, received from a third party, received from the user device, retrieved based on permissions received from the user device, and/or otherwise obtained. In this embodiment, determining the content can include extracting feature values from the data source, classifying the user based on the feature values, and selecting the content based on the determined user class. In a first example, the user associated with the user device can be classified as a dog owner, based on purchase history, products historically interacted with, and digital browsing history. The type of dog can additionally be verified based on the user's social network stream. In this example, determining the content can include selecting content targeted toward or having a high conversion rate with dog owners. In a second example, when the beacon system is associated with an airport, the user's email can be filtered for confirmations of flights within a predetermined time duration of a reference time (e.g., time that the beacon identifier was recorded by the user device, the instantaneous time, etc.), and the flight information for the confirmed flight is retrieved as the content.

In a third embodiment of the second variation, the content can mirror application content served by and/or generated by one more applications executing on the user device. In an example, the method 100 can include providing a software development kit for developing applications interacting with the beacon system; and mirroring, with the beacon system controlling the output device, content generated by an application developed using the software development kit and executed by the user device. However, the content can be otherwise determined based on user device information.

In a third variation, the content is determined based on supplementary beacon information (e.g., supplementary beacon identifiers, supplementary beacon parameters, etc.). The supplementary beacon identifier can be received from the user device, the beacon system, and/or any other suitable device. The content is preferably selected from a set of predetermined content associated with the supplementary beacon identifier and/or parameters, but can alternatively or additionally be determined based on the demographic population associated with the product or location tagged with the supplementary beacon identifier, the user's demographics, and/or based on any other suitable information. In one example, the system selects the content associated with the product identified by the supplementary beacon identifier. In a second example, the system receives a first and second supplementary beacon identifier, determines that the first product is being held by a user (e.g., based on the temperature and accelerometer data recorded by the first supplementary beacon identifier within a predetermined time frame of first supplementary beacon identifier recordation), and selects content for the product associated with the first supplementary beacon identifier (e.g., to the exclusion of the content for the product associated with the second supplementary beacon identifier). In embodiments, content determination can be based on supplementary beacon information associated with a plurality of supplementary beacons. For example, the method 100 can include one or more of: selecting a subset of supplementary beacon information (e.g., filtering information from supplementary beacons attached to products irrelevant to a user based on user device information, etc.) from which contextual content can be generated; weighing different pieces of supplementary beacon information (e.g., more heavily weighting information associated with supplementary beacons proximal user devices) in determining contextual content; and/or any other suitable operation. In a specific example, the method 100 can include associating (e.g., at the content determination system) each beacon system of a plurality of beacon systems to subsets of supplemental beacons (e.g., assigning supplemental beacons to proximal beacon systems); receiving supplemental beacon information (e.g., supplemental beacon location parameters) at the beacon system from supplemental beacons associated with the beacon system; transmitting supplemental beacon information from the beacon systems to the content determination system; and determining content based on the supplemental beacon information (e.g., content illustrating the locations of contextually relevant products with supplemental beacons attached). However, determining content based on supplementary beacon information can be performed in any suitable manner.

Figure 8:
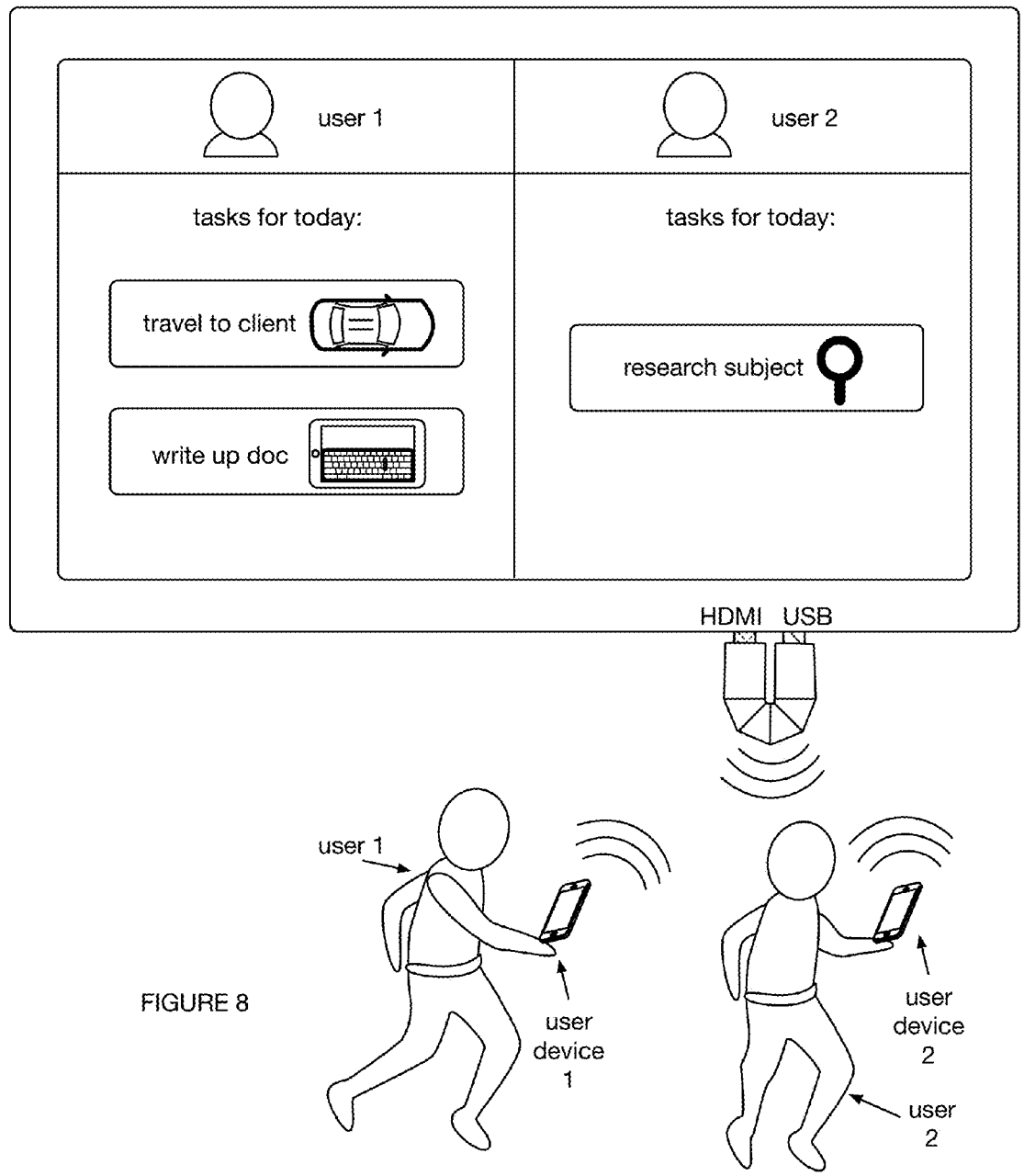
FIG. 8 is a schematic representation of an example of beacon system interaction with multiple user devices.

As shown in FIG. 8, in a fourth variation, the content is determined based on the user devices concurrently (or within a predetermined time duration) sending the beacon identifier to the content determination system. This can be indicative of the number of users concurrently collocated in front of the display. For example, a first piece of content can be selected in response to receipt of the beacon identifier from a first number of users, while a second piece of content can be selected in response to the receipt of the beacon identifier from a second number of users different from the first number. In a specific example, the method 100 can include receiving user device information (e.g., purchase histories, etc.) associated with a plurality of user devices, and determining contextual content based on similarities and/or differences in the user device information (e.g., generating content relevant to each of the users associated with the user devices, such as based on overlap between products purchased in the purchase histories). However, multiple users can be otherwise supported.

Determining content S200 is preferably performed in response to receiving an identifier (e.g., beacon identifier, supplementary beacon identifier, user device identifier) S100. Additionally or alternatively, determining content 200 can be performed in response to occurrence of a trigger event. Trigger events can include any one or more of: motion of a device (e.g., beacon system, user device, supplementary beacon), device connection (e.g., establishment of a communication connection between beacon system and user device), beacon operation parameter conditions, and/or any other suitable events. In a variation, a trigger event can be based on device motion (e.g., motion beyond a threshold motion parameter; movement of the device into a threshold distance from the beacon system, etc.). In a first example, detecting device motion can include: connecting (e.g., wirelessly) to a device (e.g., supplementary beacon, user device, etc.) with the beacon system; monitoring signal of the connection; determining device motion based on signal parameters (e.g., strength, direction with an directional antenna, etc.). In a second example, detecting device motion can include: sampling motion data at motion sensors (e.g., accelerometers, gyroscopes, etc.) of the device (e.g., supplementary beacon, user device, etc.). The motion data can be transmitted to any suitable component, compared to motion parameter conditions (e.g., thresholds, patterns, etc.), and/or otherwise manipulated. However, determining content can be performed at any suitable time based on any suitable criteria.

Presenting the content on an output connected to the beacon system S300 functions to present the determined content to the user. Content presentation is preferably controlled by the beacon system, but can additionally or alternatively be controlled by the user device, by a second beacon system, by a supplementary beacon, the output device itself, by a second output device, and/or be otherwise presented. The content is preferably presented on the output device, but can additionally or alternatively be presented on the user device, second output device, beacon system, and/or on any other suitable output. The content is preferably received from the content determination system, but can alternatively be received from any other suitable source. The content is preferably received by the master device, but can alternatively be received by the slave device and/or by any other suitable device. The content is preferably displayed (or determined) after verifying entity permission to display the contextual content, but can alternatively be displayed without verifying permissions or after any other suitable set of conditions has been satisfied. Presenting content preferably includes presenting contextual content determined by the content determination system, but can alternatively include presenting standby content (e.g., prior to and/or after presenting contextual content at the output device). Standby content can be stored in storage of the beacon system, determined by the processing system of the beacon system, and/or be otherwise determined. However, any suitable content can be presented at any suitable time in relation to any portions of the method 100.

In a first variation in which the user device is the master device, the content is sent from the content determination system to the user device, from the user device to the beacon system, and from the beacon system to the output device (e.g., the connected display). In a second variation, the content can be directly sent to the beacon system (e.g., where the beacon system can be the master device or a slave device), where the beacon system can be connected to a second network (e.g., a long-range network, such as a WiFi network). In a third variation, the content can be directly sent to the output device, where the output device identifier is associated with the beacon system (e.g., where the beacon system reads the output device identifier upon initialization). However, transmitting content to the output device can be performed through any suitable transmission scheme involving any suitable components.

In a fourth variation, the content can be transmitted to a second beacon system different from a first beacon system identified by the beacon identifier received in S100 and/or used in determining contextual content in S200. Selecting a second beacon system to present the content can be based on user location (e.g., transmitting content to a second beacon system in response to determining a user location more proximal the second beacon system than the first beacon system, etc.), user focus (e.g., transmitting content to a beacon system that a user is facing, which can be determined based on user device information such as compass data; supplementary beacon information such as sensor data; etc.), availability of output device and/or beacon system (e.g., transmitting content to a second beacon system in response to unavailability of the first beacon system, such as when the first beacon system is already controlling the output device to display contextual content for a different user, etc.), supplementary beacon information (e.g., selecting a beacon system for content transmission based on a product identifier associated with a supplementary beacon interacted with by a user, etc.), other beacon system information (e.g., beacon system sensor data), other user device information (e.g., user device sensor data), and/or any other suitable criteria. For example, the method can include, receiving a second beacon identifier (e.g., within a predetermined time period of first beacon identifier receipt) at the content determination system from a user device; determining a location parameter for the user based on the first and the second beacon identifiers; and selecting, based on the location parameter, a beacon system from the first and the second beacon systems to control presentation of the contextual content (e.g., performing any portions of the method 100 associated with transmission and presentation of contextual content). This variation can be useful if the user has physically moved to another part of the physical space while the content was being determined. The beacon system currently proximal the user can be: the beacon system currently connected to the user device; the beacon system whose identifier is currently being detected by the user device; the beacon system estimated to be within the user's line of sight, based on the user device heading and/or trajectory; and/or be any other suitable beacon system. However, content can be transmitted to any number of beacon systems (e.g., both the first and second beacon systems) for display at any number of output devices.

In a fifth variation, content can be presented at the user device. The content can be the same or different from the content presented at the output device. In an example, the method 100 can include determining user device content at the content determination system based on the first beacon identifier; and transmitting the user device content from the content determination system to the user device for presentation (e.g., concurrently with controlling the output device to present contextual content generated for the output device). However, generating and/or presenting user device content can be performed in any suitable manner.

As shown in FIG. 8, the method 100 can additionally include supporting multiple concurrent users. In a first variation, supporting multiple users includes determining a single piece of content for the users (e.g., a single advertisement based on similar items in purchase histories across the different user devices). Different pieces of content can be selected for different numbers of user devices concurrently connected to the beacon system. Content can vary based on the number of users, based on shared preferences between the users (e.g., based on user accounts associated with the user devices associated with the users), and/or vary based on any other suitable parameter. In an example, the method 100 can include receiving a first user device identifier and a second user device identifier identifying the first user device and a second user device, respectively, where determining the contextual content is based on the first user device identifier, the second user device identifier, and/or any other suitable information (e.g., a beacon identifier). In this or other variations, the method 100 can include scheduling content presentation (e.g., at a output device, at a user device) for content determined based on a plurality of users (e.g., separate pieces of content tailored for different users). Scheduling content presentation can be based on presentation parameters (e.g., third party preferences, etc.), user device information (e.g., prioritizing content for user devices associated with a user who frequently visits the third party establishment, etc.), location parameters (e.g., present content for a user device until the user device location exceeds a threshold distance from the beacon system), supplementary beacon information (e.g., prioritizing content associated with supplementary beacons attached to popular or promoted items, etc.), and/or any other suitable criteria. In an example, the method 100 can include receiving a plurality of user device identifiers; prioritizing a first user device identifier; controlling presentation at the output device of contextual content associated with the first user device identifier; and controlling presentation of the remaining contextual content at the user devices associated with the remaining user device identifiers. However, determining and/or presenting a single piece of content to support multiple users can be otherwise performed.

Figure 5:
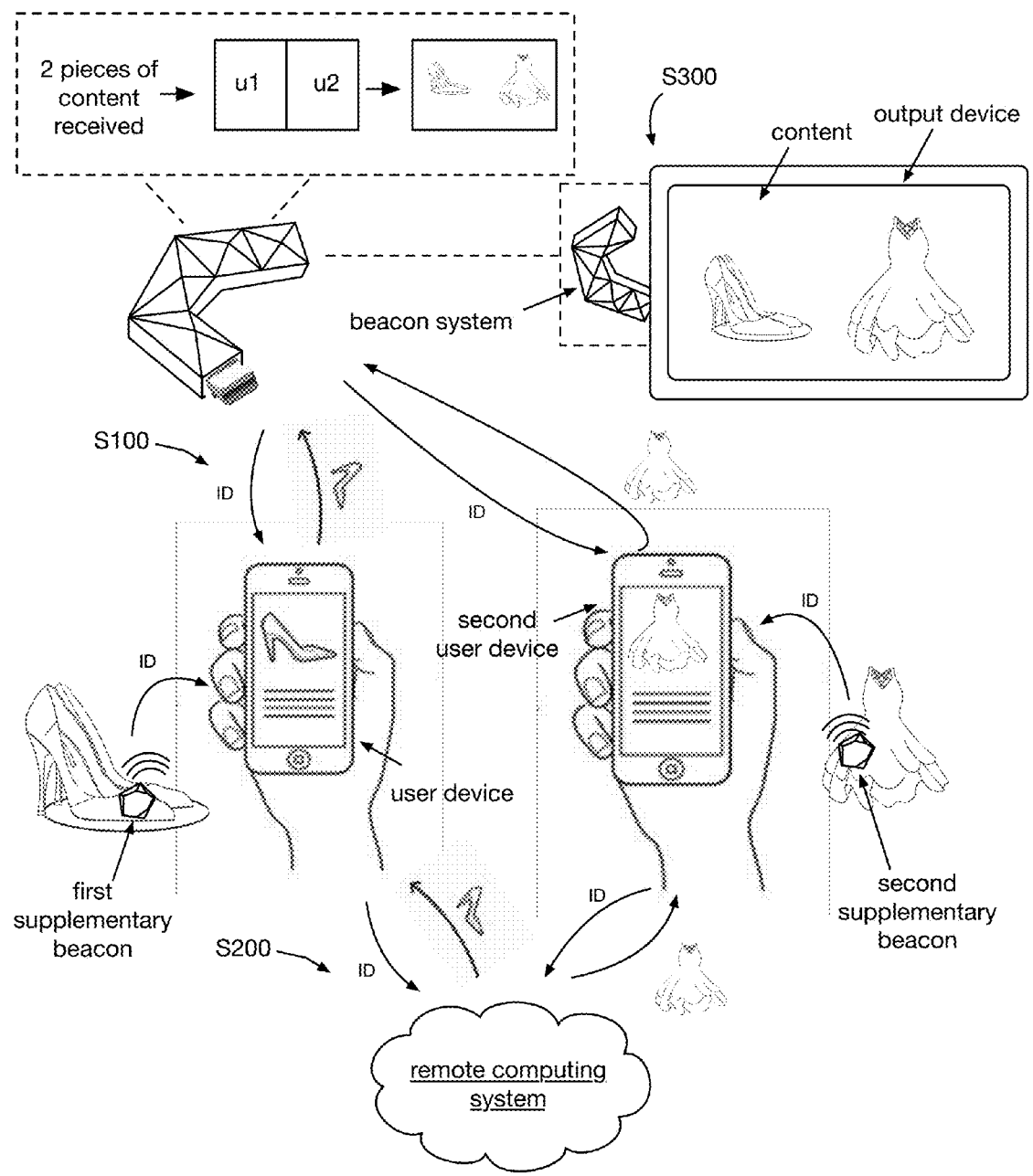
FIG. 5 is a schematic representation of an example of multiple user device interaction with the beacon system.

In a second variation, the beacon system accommodates multiple concurrent users by concurrently presenting multiple pieces of content. In a first embodiment, the beacon system receives different content for each user device connected to the beacon system (e.g., from the respective user device, from the remote system, etc.), selects a template, and displays the received content according to the template (example shown in FIG. 5). The template can be selected based on the number of users. For example, a two-segment template is selected when two users are connected to the beacon system; a three-segment template is selected when three users are connected to the beacon system. The template can additionally or alternatively be selected based on the relative user positions. For example, a vertically stacked template can be selected when the users are of different heights, a horizontally aligned template can be selected when a first user device is to the left of the display and a second user device can is the right, and an uneven template can be selected when some user devices are distal the beacon system and some are proximal the beacon system. However, the template can be selected based on any other suitable parameter. The template can be dynamically selected, statically selected, and/or otherwise selected. The beacon system can additionally automatically assign the content to template positions based on: the user device locations, the user parameters received with the content, and/or based on any other suitable parameter. In a second embodiment, the content determination system can identify different content for each user device connected to the beacon system, select a template (e.g., in the manner discussed above, and/or in any other suitable manner), populate the template, and send the populated content to the beacon system for display. Additionally or alternatively, determining and/or presenting multiple pieces of content can be otherwise performed. However, supporting multiple concurrent users can be performed in any suitable manner.

Figure 12:
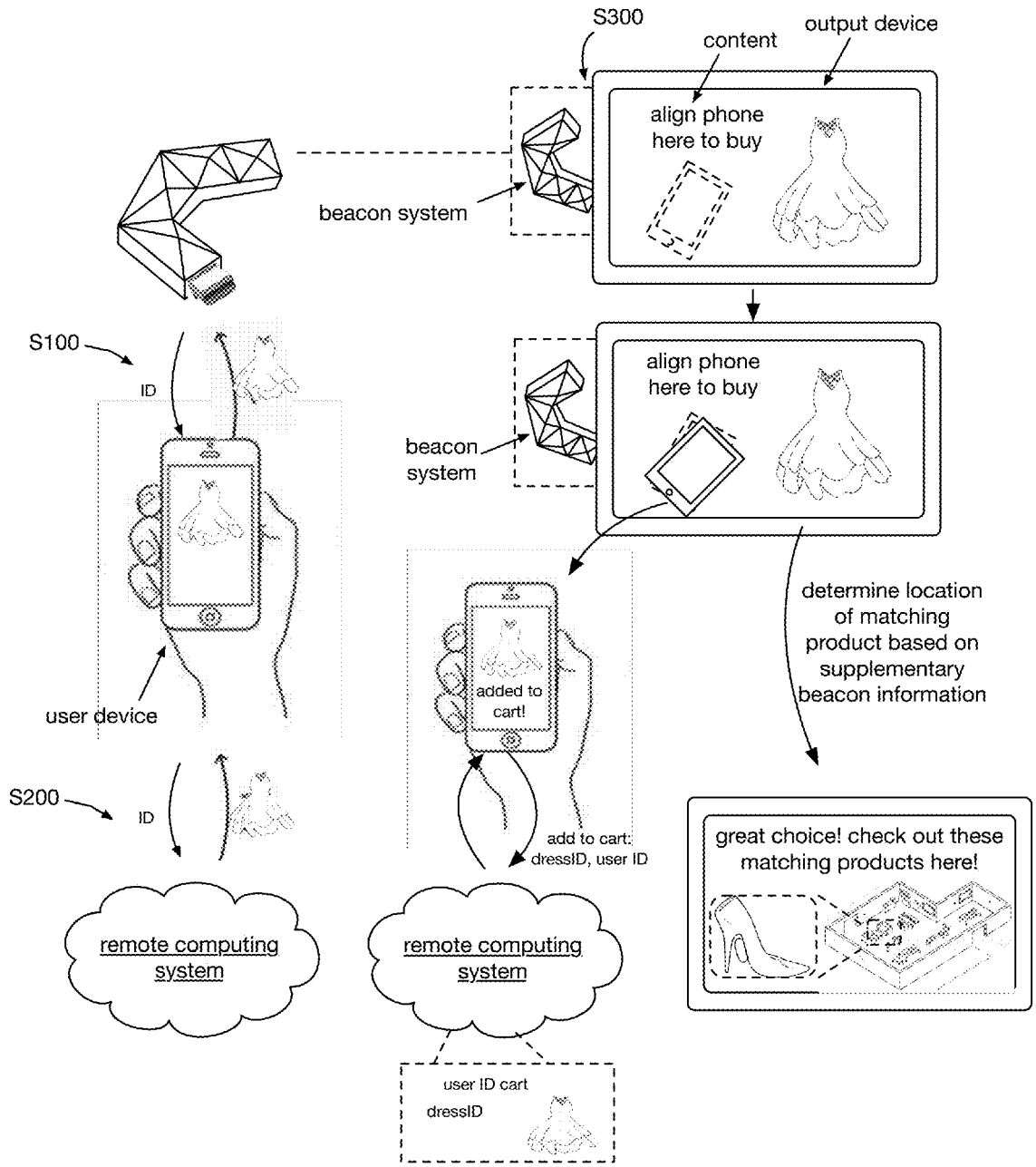
FIG. 12 is a schematic representation of an example of user action facilitation through physical proximity to the beacon or output device.

The method 100 can additionally include facilitating user actions through physical proximity to a beacon (e.g., beacon system, supplementary beacon) or output device. Physical proximity to the beacon can be measured through beacon signal strength (e.g., as measured by a scan/response service on the beacon, separate from the communication antenna), through trilateration, through comparison between a known beacon location and the user device location (e.g., through GPS), through the output's sensors, and/or otherwise determined. User actions can include facilitating purchases, triggering downstream actions, performance of a task, and/or any other suitable actions. Facilitating user actions can include: prompting the user with contextual content to perform an action (e.g., with the user device); detecting performance of the action (e.g., using the beacon system, user device, supplementary beacon, etc.; based on changes in signal strength, user device orientation sensor data, etc.); performing functions in response to performing the action; and/or any performing any suitable function. In one example, shown in FIG. 12, the content presented on the output can include an outline of a user device (e.g., phone) with instructions to align the user device with the outline. The outline can be positioned proximal the connected beacon on the output, and/or be otherwise arranged. In response to determination of user device proximity to the beacon connected to the output (e.g., the signal strength exceeding a threshold strength, etc.), the beacon (or connected system) can trigger the user action. In a specific example, when the user aligns their user device with the outline, the virtual product displayed by the content can be added to the user's virtual cart (e.g., for subsequent or immediate purchase), and the content can be animated to virtually move a virtual representation of a product (associated with a supplementary beacon) toward the outline, such that the animation appears to be "placing" the virtual product "into" the phone. In another specific example, the method 100 can include concurrently controlling presentation of user device content at a plurality of user devices (e.g., individual user tasks) and controlling presentation of contextual content at a plurality of output devices connected to beacon systems (e.g., an aggregated list of individual tasks); detecting a user action (e.g., performance of the task); and in response, updating the content at any number of the user devices and/or the contextual content at any number of the output devices (e.g., removing the performed task from the display). However, facilitating user actions can be performed in any suitable manner.

The method 100 can additionally include tracking user device progression through a physical space using the beacon systems. This information can be subsequently used to identify high-thoroughfare regions within the space, determine product placement locations, determine floor layouts, and/or be used for any other suitable purpose (e.g., by the manager). The information can additionally be used to determine advertising or promotional campaign efficacy, conversion rate, and/or any other suitable promotional metric. User device progression is preferably tracked by the remote computing system, but can additionally or alternatively be tracked by the user device (e.g., the application), the beacon systems, and/or by any other suitable system. In a first variation, tracking user device progression through a physical space includes: receiving a set of beacon identifiers from the user device over time and mapping user device location within the space across time based on the relative positions of the beacons identified by the beacon identifiers within the physical space (e.g., where the beacon identifiers are associated with static locations within the physical space). This variation can optionally include determining the items purchased by the user (e.g., based on collocation of the user device at the point of sale system during the checkout process, etc.) and determining the content presented by each beacon system while the user device was proximal the respective beacon system, where the relationship between the user purchase and content can be subsequently analyzed to determine the efficacy of a promotional campaign. In a second variation, tracking user device progression through the physical space can include tracking the beacon identifiers from which the user device identifier was received over time, and mapping user device location within the space over time based on the relative locations associated with the beacon identifiers. However, user device progression throughout the space can be otherwise determined.

The method 100 can additionally include selectively operating the beacon system as a master device or a slave device. This can function to confer the benefits of both operation as a slave (e.g., unitary user device connection and/or communication, etc.) and operation as a master (e.g., supplementary beacon monitoring, second beacon system communication and control, etc.). The beacon system can be toggled between the two control states periodically, upon occurrence of a trigger event (e.g., switched to operation as a slave upon user device detection), or at any other suitable time.

In one variation, when a plurality of beacon systems are used within the same physical space, a central control system (e.g., the remote computing system, the population of beacon systems themselves) can coordinate beacon system operation such that one beacon system operates as a master and the remainder operate as slaves. The master can monitor the supplementary beacons within the space, while the slaves can connect to the user device(s). The plurality of beacon systems can be constantly operated in this manner, with at least one of the plurality as a master, or be periodically operated in this manner, where the plurality are typically operated as slaves and only occasionally operated with one as the master. However, the plurality of beacon systems can be otherwise operated. The central control system can directly communicate with and/or control each beacon system (e.g., when every beacon system functions as a client device); directly connect to a beacon system of the plurality, where the beacon system communicates and/or controls the remainder of the beacon systems (e.g., where the first beacon functions as a client device and the remainder function as server devices); control beacon system operation through the user device (e.g., where the user device connects to and controls the beacon systems); and/or otherwise control beacon system operation.

Figure 6:
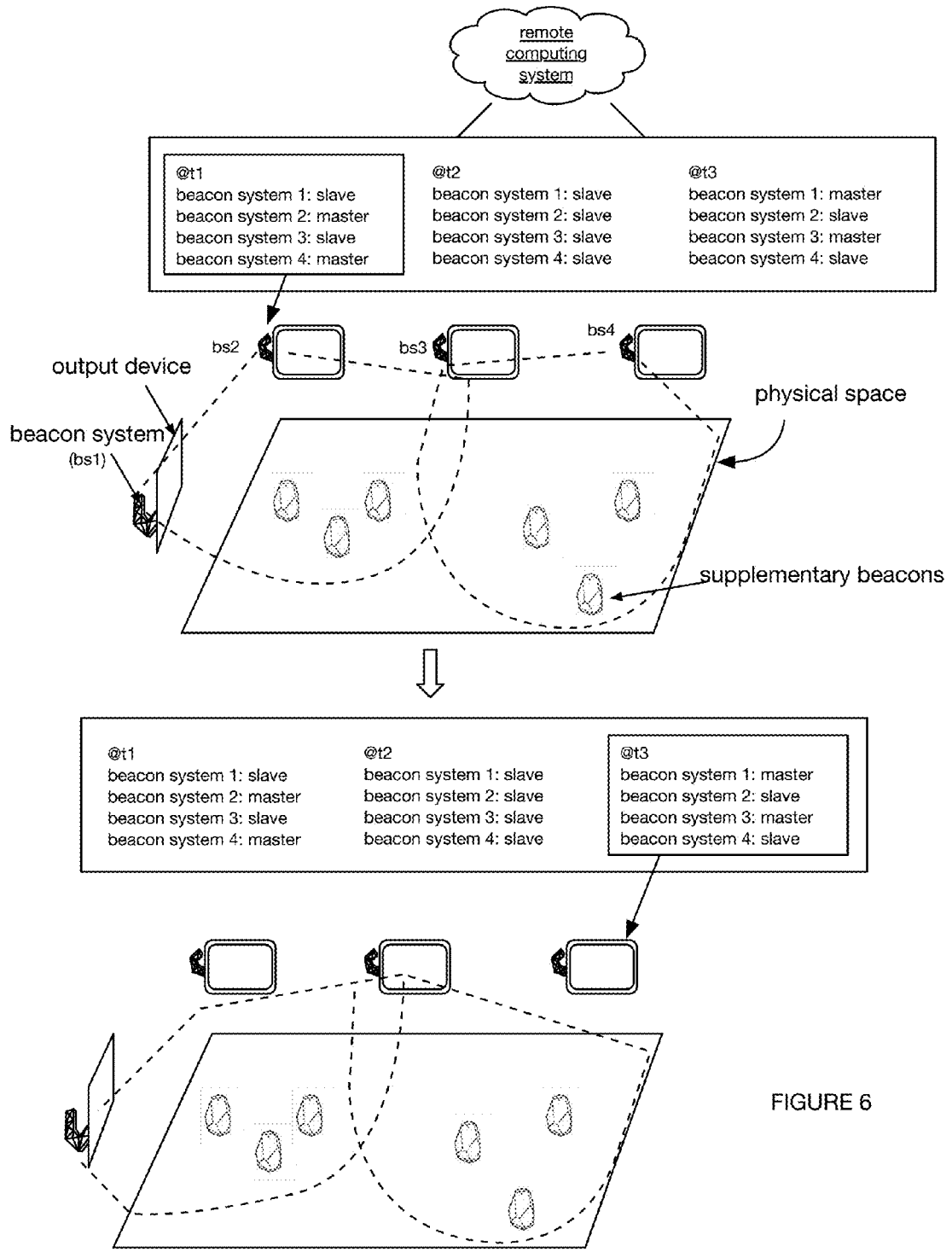
FIG. 6 is a schematic representation of an example of selective multi-beacon system operation.

In one embodiment, the plurality of beacon systems can be divided into one or more groups, where one beacon system of the group can function as the master and the remainder function as the slaves (example shown in FIG. 6). The groups are preferably determined based on physical location, such that the beacon systems of the group monitor a substantially common, overlapping physical region. However, the groups can alternatively or additionally be defined as: beacon systems sharing a common associated entity, beacon systems within a threshold distance of each other, beacon systems within a threshold distance of a reference point, and/or be otherwise defined. The group memberships can be dynamically adjusted (e.g., optimized) to cover the most physical area within the physical space, or remain substantially static. A beacon system can concurrently be part of multiple groups, or membership can be limited to a single group. Additionally or alternatively, the plurality of beacon systems can be otherwise controlled. However, selectively operating the beacon system and/or other components in different operation modes can be performed in any suitable manner.

The method 100 can additionally or alternatively include providing a development kit, which can function to enable developers to: develop applications for user devices to modify interaction with the beacon system and/or the content to be displayed; modify beacon system parameters (e.g., type of displayed content, presentation parameters such as content presentation scheduling, beacon system selection to display content, etc.); and/or perform any other suitable modification to the configuration of beacon systems, supplementary beacons, content determination systems, and/or other components. However, providing a development kit can be otherwise performed.

An alternative embodiment preferably implements the above methods in a computer-readable medium storing computer-readable instructions. The instructions are preferably executed by computer-executable components preferably integrated with a beacon management system. The beacon management system can include a beacon identification system that functions to identify a set of content associated with a received beacon identifier, a content determination system that functions to determine which content of the set to present based on secondary information (e.g., user information, supplementary beacon information, etc.), and a content presentation system that functions to present the determined content to the user. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes, where the method processes can be performed in any suitable order, sequentially or concurrently. The methods and systems include every combination and permutation of the various system components and the various method processes, including any variations, embodiments, examples, and specific examples.

As a person skilled in the art will recognize from the previous detailed description and from the figures and claims, modifications and changes can be made to the preferred embodiments of the invention without departing from the scope of this invention defined in the following claims.

We claim:

1. A method for personalizing and delivering content using beacons, the method comprising, while a first beacon system is communicably coupled to an output display:
   a) broadcasting a first beacon identifier identifying the first beacon system from the first beacon system to a first user device;
   b) receiving the first beacon identifier at a content determination system from the first user device;
   c) receiving, at the content determination system, a supplementary beacon identifier identifying a supplementary beacon;
   d) determining contextual content at the content determination system based on the first beacon identifier and the supplementary beacon identifier;
   e) transmitting the contextual content from the content determination system to the first user device, wherein the first user device automatically transmits the contextual content to the first beacon system in response to receiving the contextual content;
   f) receiving the contextual content at the first beacon system from the first user device; and
   g) controlling the output display with the first beacon system to present the contextual content.

2. The method of claim 1, further comprising, while operating the first beacon system in master mode:
   monitoring for broadcasting of the supplementary beacon identifier; and
   receiving the supplementary beacon identifier at the first beacon system from the supplementary beacon; and
   transmitting the supplementary beacon identifier from the first beacon system to the content determination system.

3. The method of claim 1, further comprising, concurrently with performing a) through f), continuously broadcasting the first beacon identifier with the first beacon system for receipt by a second user device.

4. The method of claim 1, further comprising:
   determining user device content at the content determination system based on the first beacon identifier; and
   transmitting the user device content from the content determination system to the first user device, wherein the user device content is presented at the first user device concurrently with controlling the output display to present the contextual content.

5. The method of claim 4, further comprising
prompting the user with the contextual content to perform an action with the first user device; and
in response to detecting performance of the action using the first beacon system, updating the contextual content and the user device content presented on the output display and the first user device, respectively.

6. The method of claim 1, further comprising:
receiving a second beacon identifier at the content determination system from the first user device within a predetermined time period from first beacon identifier receipt, the second beacon identifier identifying a second beacon system;
determining a location parameter for the user based on the first and the second beacon identifiers; and
selecting, based on the location parameter, a beacon system from the first and the second beacon systems to control presentation of the contextual content, wherein d) through f) are performed in response to selecting the first beacon system.

7. The method of claim 1, further comprising receiving, at the content determination system, a first user device identifier and a second user device identifier identifying the first user device and a second user device, respectively, wherein determining the contextual content is based on the first user device identifier, the second user device identifier, and the first beacon identifier.

8. A method for personalizing and delivering content using beacons, the method comprising, while a beacon system is drawing power from an output display through a first wired connection:
a) detecting motion of a first beacon, separate and distinct from the beacon system;
b) in response to detecting the motion of the first beacon, receiving, at a content determination system, a first beacon identifier identifying the first beacon;
c) determining contextual content with the content determination system based on the first beacon identifier;
d) receiving the contextual content at the beacon system; and
e) sending the contextual content from the beacon system to the output display through a second wired connection.

9. The method of claim 8, wherein detecting the motion comprises:
receiving accelerometer data sampled at an accelerometer of the first beacon; and
detecting the motion based on the accelerometer data.

10. The method of claim 8, wherein the method further comprises:
concurrently with performing a) through c), controlling the output display with the beacon system to present standby content.

11. A method for personalizing and delivering content using beacons, the method comprising, while a first beacon system is communicably coupled to an output display:
a) broadcasting a first beacon identifier identifying the first beacon system from the first beacon system to a first user device;
b) receiving the first beacon identifier at a content determination system from the first user device;
c) determining contextual content at the content determination system based on the first beacon identifier;
d) transmitting the contextual content from the content determination system to the first user device, wherein the first user device automatically transmits the contextual content to the first beacon system in response to receiving the contextual content;
e) receiving the contextual content at the first beacon system from the first user device;
f) controlling the output display with the first beacon system to present the contextual content;
g) receiving a second beacon identifier at the content determination system from the first user device within a predetermined time period from first beacon identifier receipt, the second beacon identifier identifying a second beacon system;
h) determining a location parameter for the user based on the first and the second beacon identifiers; and
i) selecting, based on the location parameter, a beacon system from the first and the second beacon systems to control presentation of the contextual content, wherein d) through f) are performed in response to selecting the first beacon system.

12. The method of claim 11, further comprising receiving, at the content determination system, a supplementary beacon identifier identifying a supplementary beacon, wherein determining the contextual content is based on the supplementary beacon identifier and the first beacon identifier.

13. The method of claim 12, further comprising, while operating the first beacon system in a master mode:
monitoring for broadcasting of the supplementary beacon identifier; and
receiving the supplementary beacon identifier at the first beacon system from the supplementary beacon; and
transmitting the supplementary beacon identifier from the first beacon system to the content determination system.

14. The method of claim 12, further comprising detecting motion of the supplementary beacon, wherein the supplementary beacon identifier is received at the content determination system after detecting the motion.

* * * * *